US010594555B2

United States Patent
McNab et al.

(10) Patent No.: US 10,594,555 B2
(45) Date of Patent: Mar. 17, 2020

(54) CLOUD-ENABLED TESTING OF CONTROL SYSTEMS

(71) Applicant: INTELLIGENT PLATFORMS, LLC, Charlottesville, VA (US)

(72) Inventors: Keith George McNab, Albany, NY (US); Robert Turner, Salem, VA (US)

(73) Assignee: INTELLIGENT PLATFORMS, LLC, Charlottesville, VA (US)

( * ) Notice: Subject to any disclaimer, the term of this patent is extended or adjusted under 35 U.S.C. 154(b) by 139 days.

(21) Appl. No.: 15/588,042

(22) Filed: May 5, 2017

(65) Prior Publication Data

US 2018/0176084 A1 Jun. 21, 2018

Related U.S. Application Data

(60) Provisional application No. 62/435,610, filed on Dec. 16, 2016.

(51) Int. Cl.
*H04L 12/24* (2006.01)
*H04L 12/26* (2006.01)
(Continued)

(52) U.S. Cl.
CPC ...... *H04L 41/0869* (2013.01); *G05B 19/0423* (2013.01); *G05B 19/0426* (2013.01);
(Continued)

(58) Field of Classification Search
CPC . H04L 41/0869; H04L 41/24; H04L 41/0253; H04L 41/22; H04L 43/50;
(Continued)

(56) References Cited

U.S. PATENT DOCUMENTS 5,339,430 A 8/1994 Lundin et al.
6,668,374 B1 12/2003 Sten et al.
(Continued)

FOREIGN PATENT DOCUMENTS

CN 102354174 A 2/2012
CN 202218269 U 5/2012
(Continued)

OTHER PUBLICATIONS

Feld, Profinet-Scalable Factory Communication for All Applications, Factory Communication Systems, 2004. Proceedings. 2004 IEEE International Workshop, pp. 33-38 (2004).
(Continued)

*Primary Examiner* — Alina A Boutah
(74) *Attorney, Agent, or Firm* — Marshall, Gerstein & Borun LLP

(57) ABSTRACT

A system and method for testing a control system is disclosed. The control system includes a field device located in one area and a controller located in a different area. A mobile application running on a mobile computing device is used by a technician to test the control system. Because both the mobile computing device and the controller are coupled to a cloud computing system, the technician may interface with the controller while located at the field device. This remote access to the controller allows a single technician to test the control system by interfacing with the controller and the field device simultaneously. In addition, the mobile application may retrieve data from the cloud computing system to facilitate testing and may transmit test results to the cloud for storage. Others having access to the stored results may view the progress and results of the testing.

19 Claims, 15 Drawing Sheets

(51) Int. Cl.

| | | |
|---|---|---|
| G05B 19/042 | (2006.01) | |
| H04L 29/08 | (2006.01) | |
| G06F 8/73 | (2018.01) | |
| H04W 4/00 | (2018.01) | |
| G06F 8/65 | (2018.01) | |
| G06F 21/57 | (2013.01) | |
| G05B 19/418 | (2006.01) | |
| H04W 4/38 | (2018.01) | |

(52) U.S. Cl.
CPC ..... *G05B 19/4185* (2013.01); *G05B 19/4186* (2013.01); *G05B 19/4187* (2013.01); *G05B 19/41835* (2013.01); *G06F 8/65* (2013.01); *G06F 8/73* (2013.01); *G06F 21/577* (2013.01); *H04L 43/50* (2013.01); *H04L 67/10* (2013.01); *H04L 67/34* (2013.01); *H04W 4/00* (2013.01); *H04W 4/38* (2018.02); *G05B 2219/21086* (2013.01); *G05B 2219/25064* (2013.01); *H04L 41/0253* (2013.01); *H04L 41/24* (2013.01); *Y02P 90/18* (2015.11); *Y02P 90/28* (2015.11); *Y02P 90/86* (2015.11)

(58) Field of Classification Search
CPC .......... H04L 67/34; H04L 67/10; H04W 4/00; H04W 4/38; G05B 19/0423; G05B 19/4186; G05B 19/4185; G05B 19/0426; G05B 19/41835; G05B 2219/21086; G05B 2219/25064; Y02P 90/86; Y02P 90/18; Y02P 90/28; G06F 8/73; G06F 8/65; G06F 21/577
See application file for complete search history.

(56) References Cited

U.S. PATENT DOCUMENTS

| | | | | |
|---|---|---|---|---|
| 7,010,294 | B1* | 3/2006 | Pyotsia | G05B 19/042 340/3.1 |
| 7,203,560 | B1 | 4/2007 | Wylie et al. | |
| 7,263,546 | B1 | 8/2007 | Kostadinov | |
| 7,355,730 | B2 | 4/2008 | Landau et al. | |
| 7,493,612 | B2 | 2/2009 | Tzeng | |
| 7,669,197 | B1 | 2/2010 | O'Neill et al. | |
| 7,673,298 | B2 | 3/2010 | Oyama | |
| 7,987,305 | B2 | 7/2011 | Blair et al. | |
| 8,155,041 | B2 | 4/2012 | Hong et al. | |
| 8,276,009 | B2 | 9/2012 | King | |
| 8,451,753 | B2 | 5/2013 | Vanga et al. | |
| 8,601,170 | B1 | 12/2013 | Marr et al. | |
| 8,681,571 | B2 | 3/2014 | Fox et al. | |
| 8,756,041 | B2* | 6/2014 | Maturana | G05B 17/02 703/7 |
| 8,887,056 | B2 | 11/2014 | Breternitz et al. | |
| 9,063,639 | B2 | 6/2015 | Grewal | |
| 9,253,054 | B2 | 2/2016 | Maturana et al. | |
| 9,798,534 | B1 | 10/2017 | Yi et al. | |
| 2002/0130846 | A1* | 9/2002 | Nixon | G05B 19/042 345/169 |
| 2003/0204373 | A1* | 10/2003 | Zielinski | G05B 9/02 702/184 |
| 2005/0122232 | A1* | 6/2005 | DeGroot | G05B 19/042 340/870.2 |
| 2005/0273681 | A1* | 12/2005 | Hopkins | H04L 12/40052 714/724 |
| 2006/0179058 | A1 | 8/2006 | Bram et al. | |
| 2008/0114902 | A1 | 5/2008 | Leong et al. | |
| 2008/0127356 | A1 | 5/2008 | Hsu et al. | |
| 2009/0076628 | A1 | 3/2009 | Smith et al. | |
| 2009/0209250 | A1* | 8/2009 | Huq | H04L 43/50 455/425 |
| 2010/0023140 | A1 | 1/2010 | Kodama et al. | |
| 2010/0149997 | A1* | 6/2010 | Law | G05B 19/4185 370/248 |
| 2011/0022192 | A1 | 1/2011 | Plache et al. | |
| 2011/0055632 | A1* | 3/2011 | Zimmerman | G06F 11/2294 714/31 |
| 2012/0042213 | A1* | 2/2012 | Zimmerman | H04L 43/12 714/46 |
| 2012/0291021 | A1 | 11/2012 | Banerjee et al. | |
| 2013/0003565 | A1* | 1/2013 | Gotwals | H04L 43/50 370/248 |
| 2013/0211555 | A1* | 8/2013 | Lawson | G05B 19/4185 700/28 |
| 2013/0211559 | A1 | 8/2013 | Lawson et al. | |
| 2013/0191106 | A1 | 12/2013 | Kephart et al. | |
| 2014/0075015 | A1 | 3/2014 | Chan et al. | |
| 2014/0101652 | A1 | 4/2014 | Kamble et al. | |
| 2014/0189677 | A1 | 7/2014 | Curzi et al. | |
| 2014/0335480 | A1 | 11/2014 | Asenjo et al. | |
| 2014/0336795 | A1 | 11/2014 | Asenjo et al. | |
| 2014/0337429 | A1* | 11/2014 | Asenjo | H04L 65/403 709/204 |
| 2015/0012763 | A1 | 1/2015 | Cohen et al. | |
| 2015/0019191 | A1* | 1/2015 | Maturana | G05B 17/02 703/13 |
| 2015/0073918 | A1* | 3/2015 | Aronson | G06Q 30/0269 705/14.66 |
| 2015/0082309 | A1 | 3/2015 | Lambert et al. | |
| 2015/0287318 | A1 | 10/2015 | Nair et al. | |
| 2016/0028605 | A1* | 1/2016 | Gil | H04W 4/38 709/213 |
| 2016/0092765 | A1* | 3/2016 | Chilimbi | G06N 3/0454 706/25 |
| 2016/0132538 | A1 | 5/2016 | Bliss et al. | |
| 2016/0274552 | A1* | 9/2016 | Strohmenger | G05B 11/01 |
| 2016/0373944 | A1* | 12/2016 | Jain | H04L 43/50 |
| 2016/0381123 | A1* | 12/2016 | Kanne | H04Q 9/00 709/224 |
| 2017/0180239 | A1* | 6/2017 | Hittel | H04L 9/30 |
| 2017/0245162 | A1* | 8/2017 | Beck | H04L 43/50 |
| 2017/0257262 | A1* | 9/2017 | Dalal | H04L 43/50 |
| 2018/0024847 | A1* | 1/2018 | Campbell | G06F 9/453 715/708 |
| 2018/0026840 | A1* | 1/2018 | Toepke | H04L 67/06 709/222 |
| 2018/0052451 | A1* | 2/2018 | Billi-Duran | G05B 19/41835 |
| 2018/0176335 | A1 | 6/2018 | McNab | |
| 2018/0210428 | A1* | 7/2018 | Jundt | H04L 67/12 |

FOREIGN PATENT DOCUMENTS

| | | |
|---|---|---|
| EP | 2688019 A1 | 1/2014 |
| EP | 2 924 570 A2 | 9/2015 |

OTHER PUBLICATIONS

Electrical and Instrumentation Loop Check, IEC Webstore International Electrotechnical Commission, Edition 2.0, pp. 42 (2012).

Hazarika et al., Mobile Cloud Integration for Industrial Data Interchange, Advances in Computing, Communications and Informatics (ICACCI), pp. 1118-1122 (2015).

Welander, Make your I/O smarter, Control Engineering, www.conlroleng.com/single-article/make-your-iosmarter/37788148d81ce850279c60f46135457b.hlml, last visited Jan. 2013, 3 pp.

"Leading Technology in Ethernet Relays, Data Acquisition, and Remote Monitoring, ConlrolByWeb, www.conlrolbyweb.com/, last visited Aug. 4, 2016, 6 pp."

"International Search Report and Written Opinion issued in connection with corresponding PCT Application No. PCT/US2017/064382 dated Mar. 15, 2018".

"Renesas Electronics Announces Development of Virtualization Technology Suitable for Real-Time Processing of V850CPU Core. Oct. 12, 2010, https:/lwww.renesas.com/en-hq/about/press-center/news/2010/news20101012a.html, last visited Aug. 9, 2017, 3 pp."

Achieving Real-Time Performance on a Virtualized Industrial Control Platform. http://https://www.intel.com/content/dam/www/public/us/en/documents/white-papers/industrial-solutions-real-timeperformance-white-paper.pdf, last visited Jul. 15, 2014, 7 pp.

(56) References Cited

OTHER PUBLICATIONS

Grugon, Chris, "The need for embedded virtualization in real-time, multiprocessor, multi-OS systems," http://embedded-computing.com/articles/the-multiprocessor-multi-os-systems/, last visited Jun. 2016, 7 pp.

"Distributed control system software upgrade, NovaTech's updated DCS software, D/3 Version 15 (D3v15) addsfeatures that are focused on modernizing configuration, improving operator interfaces, and facilitating reporting, http://www.controleng.com/single-article/distributed-control-system-software-upgrade/~24abcb53c6f4f851d05cd17293ea2c.html, last visited Apr. 5, 2016, 2 pp."

"Thorve, Nitin et al., ""Step-by-step guide to IBM Power Systems firmware update"", License Internal Code (LIC) upgrade process, Mar. 26, 2013, https://www.ibm.com/developerworks/aix/tutorials/au-power-systems-1rmware-upgrade/au-power-systems-firmware-upgrade-pdf.pdf., 28 pp."

"Advantech Launches WISE-4051: RS-485 Wireless 1/0 Module with Cloud Connectivity and IoT Protocol, AdvantechCo. Ltd., www2.advantech.in/eautomation/remote-io/news.aspx?doo_id=88f8f32e-fc95-4484-a02c-80543cf7fd56, last visited Jul. 11, 2016, 2 pp."

International Search Report and Written Opinion issued in connection with corresponding PCT Application No. PCT/US2017/60089 dated Feb. 14, 2018.

Miller, D.H., et al., Industrial internet connected control system, GE Pending U.S. Appl. No. 62/435,610, filed Dec. 16, 2016.

\* cited by examiner

FIG. 2F

| ●●●○○ FSMP 📶 | 12:00 PM | 100% 🔋 |
|---|---|---|
| Cancel | LV-15 | Done |

FUNCTION CHECK

| Data Streaming On | | Stop Test |
|---|---|---|

| 0% | Valve Position | 0 |
| | Expected | 0 |
| | Error % | 0 |

| 25% | Valve Position | Enter Value 👆 |
| | Expected | 0.4 |
| | Error % | -- |

| 50% | Valve Position | Enter Value |
| | Expected | 50.2 |
| | Error % | -- |

| 75% | Valve Position | Enter Value |
| | Expected | 75.1 |
| | Error % | -- |

| 100% | Valve Position | Enter Value |
| | Expected | 100 |
| | Error % | -- |

FIG. 2E

| ●●●○○ FSMP 📶 | 12:00 PM | 100% 🔋 |
|---|---|---|
| Cancel | LT-15 | Done |

FUNCTION CHECK                                Trend 📈

| Data Streaming Off | | Start Test 👆 |
|---|---|---|

| Forcing | | False |
| Quality | | Good |
| Field | I/O Value Expected | Error % |

| 4 mA | 100 ⊢H 0 ⊢L H2O | 0 | Record |
| Edit | | -- | |

| 8 mA | 100 ⊢H 0 ⊢L H2O | 21.74 | Record |
| Edit | | -- | |

| 12 mA | 100 ⊢H 0 ⊢L H2O | 43.41 | Record |
| Edit | | -- | |

| 16 mA | 100 ⊢H 0 ⊢L H2O | 65.27 | Record |
| Edit | | -- | |

| 20 mA | 100 ⊢H 0 ⊢L H2O | 87.9 | Record |
| Edit | | -- | |

CLOUD-ENABLED TESTING OF CONTROL SYSTEMS

CROSS REFERENCE TO RELATED APPLICATION

This application claims priority to and benefit of U.S. Provisional Patent Application Ser. No. 62/435,610 filed Dec. 16, 2016, which is fully incorporated by reference and made a part hereof.

TECHNICAL FIELD

The present disclosure relates to industrial control systems and more specifically, to the testing of a cloud-enabled industrial control system, wherein the connection to the cloud enables improved test efficiency and expands access to test results.

BACKGROUND

Commissioning a control system is important for verifying the correct installation of field devices and their interface to the control system. Commissioning includes tests to exercise electrical and instrumentation (E&I) equipment (e.g., field devices) to check that all components, including hardware, wiring, and software function correctly and signals display accurately on panel readouts and human-machine interfaces (HMIs). E&I equipment includes sensors (inputs), actuators (outputs), motor control, interlocks, alarms, safety overrides, and the like. Where applicable, the testing of entities that form a signal path from the field to the control system and back to the field is performed together in what is designated as a loop or a control loop. Generally, instrumentation, motor control centers (MCCs), alarms, and interlocks are tested and validated as part of the commissioning process. These tests are often referred to as function tests or functional tests.

Commissioning an industrial facility may also include tests to visually inspect components and/or verify documentation, which are separate from the tests that comprise functional tests.

Testing of instrumentation typically requires manipulation of a signal associated with an E&I device. Generally, an input, as used herein, comprises a signal that is generated by an E&I (i.e., field) device and received by a control system. Conversely, an output, as used herein, comprises a signal that is generated by the control system and causes a response in an E&I device. Therefore, input means manipulating the signal from the field and for outputs this means manipulating the signal from the control system typically from an HMI workstation. For example, to carry out a simple test on an input, a technician would go into the field and manipulate the input using a calibration device such as a signal simulator to vary the input over the device's range (i.e. interject a 4-20 mA or for a digital fieldbus simply use an interfacial device as the calibration device to command the signal to vary over its range). Simultaneously, another technician will be in the control room, which is physically located away from the field device, to see how the input signal is displayed on an HMI screen. The technician in the field will set the input to some value and communicate back to the control room to ask the other technician to validate that the signal is displayed correctly. If it is correctly displayed, then the signal is wired correctly from the field to the control system, which generally includes from the field to an I/O module, from the I/O module to the controller, from the controller to the supervisory network. It also validates that the software has scaled and tagged the signal correctly.

For a set of E&I devices that constitute a loop, manipulation may also be done on one of the devices to see if the proper response is achieved by the other components that comprise the loop.

FIG. 1 illustrates the current method to perform function tests of control system inputs and outputs. Generally, the current method of performing function tests of a control system is described in an IEC Standard, IEC 62382 Electrical and Instrumentation Loop Check. 2012, Edition 2.0. Switzerland, IEC Central Office, incorporated by reference. As shown in FIG. 1, currently, to perform function tests, a first technician (Technician A) 102 is typically positioned in a control room 104 at a workstation 106 such as a PC based workstation that acts as a human to machine interface (HMI), while a second technician (Technician B) 108 is positioned at a field device 110. Field devices 110 may comprise, for example, devices such as level transmitters, alarms, and the like that create analog or digital signals that are received by a controller 116. Field devices 110 may also comprise, for example, devices that receive analog or digital signals that originate from the controller 116 where such analog or digital signals may comprise control signals to motorized valves, speed signals, start and shut-down signals, and the like. Field devices 110 may also comprise, for example, motors and/or motor control centers, and the like. In the exemplary case of FIG. 1, the field device 110 being tested is a flow transmitter (FT 321) for measuring flow through a pipe, which provides an analog input to the control system 114. Other field devices 110 shown in FIG. 1 include a modulating valve that is positioned by an analog output from the control system 114. Another field device shown in FIG. 1 is a motor, which may interface to a motor control center (MCC) (which may also be considered a field device 110) and may require analog and/or digital inputs and outputs from the control system 114 to, for example, start or stop the motor, control motor speed (if variable speed), provide feedback as to the status of the motor, and the like.

The two technicians, Technician A 102 and Technician B 108 communicate during the test using a communication device 112 such as a walkie-talkie, cell phone, phone system, intercom, etc. The exemplary control system 114 of FIG. 1 is comprised of an input/output (I/O) network that may include as components the controller 116, an I/O module 118, and communications connections 120, which may be wired (including fiber optics), wireless, or combinations thereof that communicatively couples the various components. Various control protocols such as ProfiBus, ModBus, etc. can be used for transmitting data and/or instructions among the components.

As shown in FIG. 1, Technician B 108 uses a calibration device 122 to inject a signal into the control system 114, where the signal is to simulate a signal from an analog input field device 110 such as FT 321. Alternatively, the Technician B 108 could cause the field device 110 itself to inject the signal into the control system 114. For example, if the field device 110 was a pressure transmitter having a diaphragm, the Technician B 108 could manually put pressure on the diaphragm. For example purposes, assume that the expected input signal from field device 110 is a 4-20 mA analog signal, where the 4-20 mA signal represents the flow rate from 0 to 100 standard cubic feet per minute (SCFM). It is to be appreciated that a 4-20 mA signal is for example purposes only and the analog input signal may be a current input of any range or a voltage input of any range. Returning to the example, assume that Technician B 108 injects a 12 mA signal into the control system 114 using the calibration device 122. The 12 mA signal is representative of a signal that would be generated by field device 110 FT 321 during operation. The signal is received at the I/O module 118 (where it may or may not be scaled), and then is transmitted from the I/O module 118 to the controller 116, where it may undergo further processing and/or scaling. The controller 116 is communicatively coupled with the workstation 106, which has a HMI such as a graphical user interface (GUI). Technician A 102 monitors the workstation 106. After injecting the 12 mA signal into the control system 114, Technician B 108 will contact Technician A 102 over the communication device 112 and ask Technician A 102 what value Technician A 102 is seeing on the HMI. In this example, Technician B 108 would expect Technician A 102 to see a value of approximately 60 SCFM for the field device 110 FT321. Technician A 102 watches the HMI of the workstation 106 to see that the displayed value is correct and that it represents the scaled value for field device 110 FT321 in proper engineering units. Generally, Technician A 102 would then record the result of the test in a spreadsheet manually.

The purpose of the exemplary exercise represented by FIG. 1 is to validate that the signal entered from the field (i.e., 12 mA) gets processed throughout the control system 114 to represent the correct value and engineering units for field device 110 FT321. This test also checks all wiring/communications from the field device 110 FT321 to the I/O module 118, to the controller 116, to the workstation 106. This also checks that any analog to digital conversion done by the control system 114 is correct and the final value displayed at the workstation 106 is scaled correctly. Alarm checking may also be performed in a similar manner.

The communication between Technician B 108 and Technician A 102 as shown in FIG. 1, as well as manual recordation of results, may slow the testing progress and may lead to errors. Furthermore, as illustrated in FIG. 1, such testing requires at least two technicians, Technician A 102 and Technician B 108.

A need, therefore, exists for methods and systems that overcome challenges in the art, some of which are described above.

SUMMARY

Disclosed and described herein are systems and methods for one-technician documentation check out, visual inspection and testing of a control system.

In one aspect, a method for performing a documentation check of a cloud connected control system by a single technician is described. The method comprises receiving, by a cloud computing system, an instrument index that represents a control system and storing the instrument index in cloud storage associated with the cloud computing system, wherein the instrument index is an as-designed representation of the control system; receiving, by the cloud computing system, an as-built representation of the control system; comparing, by a cloud service executing on the cloud computing system, the instrument index with the as-built representation of the control system to determine if a discrepancy exists between the instrument index and the as-built representation of the control system; and if the discrepancy exists between the instrument index and the as-built representation of the control system, then transmitting the discrepancy to a web-based interface.

Alternatively or optionally, the method for performing a documentation check of a cloud connected control system by a single technician may comprise receiving the as-built representation of the control system from the control system. Alternatively or optionally, transmitting the discrepancy to the web-based interface may comprise transmitting the discrepancy to a mobile computing device wherein an application executing on the mobile computing device provides an indication of the discrepancy. In some instances, the application executing on the mobile computing device renders a graphical user interface that provides a visual display of the discrepancy.

Alternatively or optionally, the method for performing a documentation check of a cloud connected control system by a single technician may comprise correcting the discrepancy and creating verified design documentation for the control system, wherein the verified design documentation is stored in the cloud storage of the cloud computing system.

Alternatively or optionally, the method for performing a documentation check of a cloud connected control system by a single technician may comprise performing testing of the control system, wherein the application executing on the mobile computing device of the mobile computing device provides a warning if the verified design documentation is not used for the testing, and wherein said testing comprises performing a functional test of the control system.

Alternatively or optionally, the method for performing a documentation check of a cloud connected control system by a single technician may comprise providing the verified design documentation of the control system via the cloud computing system to one or more technicians to assist in a visual inspection of one or more field devices that comprise the control system by rendering, on the mobile computing device, a loop diagram of at least a portion of the control system, said loop diagram including one or more of the field devices, wherein the one or more technicians use the loop diagram to determine whether the one or more field devices are labeled correctly and terminated correctly. Alternatively or optionally, the mobile computing device may further comprise a camera, wherein the camera is used to capture an image of the one or more field devices and the captured image is transmitted to the cloud computing system by the mobile computing device and stored in the cloud storage.

Alternatively or optionally, the method for performing a documentation check of a cloud connected control system by a single technician may comprise entering documentation check notes or visual inspection notes in the graphical user interface of the mobile computing device and transmitting the documentation check notes or visual inspection notes, by the mobile computing device, to the cloud computing system and storing the documentation check notes or visual inspection notes in cloud storage.

In another aspect, a method is described for one-technician function testing of an input from a field device to a control system. The method also comprises receiving, by a controller over an I/O network, a field signal that is associated with a field device, wherein the field device is normally communicatively coupled to the controller through the I/O network and wherein the field device and the controller are remotely spaced; sending a controller value for the field device from the controller in response to the field signal to a mobile computing device located proximate to the field device, wherein the mobile computing device executes an application that interfaces with the controller through a wireless network; and displaying, on a graphical user interface rendered by the application running on the mobile computing device, the controller value for the field device returned from the controller in response to the field signal.

Alternatively or optionally, the method may further comprise receiving, by the mobile computing device running the application, a function test results indication for the controller value for the field device returned from the controller in response to the field signal.

Alternatively or optionally, the method may further comprise transmitting, using the mobile computing device running the application, the function test results indication for the controller value for the field device returned from the controller in response to the field signal and the controller value for the field device returned from the controller in response to the field signal to a cloud computing system for storage in a cloud storage.

In some instances, the function test results indication indicates validation or non-validation of the controller value for the field device returned from the controller in response to the field signal. For example, validation of the controller value for the field device returned from the controller in response to the field signal indicates an acceptable value, scale and engineering units for the controller value for the field device returned from the controller in response to the field signal. In other instances, non-validation of the controller value for the field device returned from the controller in response to the field signal indicates that at least one of the value, scale or engineering units of the controller value for the field device returned from the controller in response to the field signal are unacceptable.

In some instances, the field signal may be generated by the field device. In other instances, the field signal may be generated by a calibration device.

In some instances, the wireless network comprises cloud services, and wherein the cloud services execute on a cloud computing system that is communicatively coupled to the controller and the mobile computing device. In other instances, the wireless network comprises a local wireless-fidelity (WiFi) network and the WiFi network is communicatively coupled to the controller and the mobile computing device and services running on computer platforms near the premise.

In another aspect, a method is described for one-technician function testing of an output from a controller of a control system to a field device. The method comprises setting an output of a controller to a controller value using a mobile computing device located at a remote field device that is communicatively coupled to the controller through an input/output (I/O) network, wherein the mobile computing device executes an application that interfaces with the controller through a wireless network; receiving, by the field device, the set output from the controller, wherein the set output is received by the field device through the I/O network; and receiving, by the mobile computing device, an indication of an observed response of the field device to the set output of the controller.

Alternatively or optionally, the method may further comprise comparing the observed response to an expected response to test a function of the control system; and transmitting, using the mobile computing device, the results of the comparison to a cloud storage in a cloud computing system.

In some instances, receiving, by the mobile computing device, an indication of an observed response of the field device to the set output of the controller further comprises: visually observing the response of the field device; and entering a value corresponding to the observed response of the field device into a graphical user interface rendered by the application running on the mobile computing device.

In some instances, receiving, by the mobile computing device, an indication of an observed response of the field device to the set output of the controller further comprises: measuring, using a sensing device, the response of the field device; and entering the measurement into a graphical user interface rendered by the application running on the mobile computing device.

In some instances, the wireless network comprises a cloud service, and wherein the cloud service executes on a cloud computing system that is communicatively coupled to the controller and the mobile computing device. In other instances, the wireless network comprises a local wireless-fidelity (WiFi) network and the WiFi network is communicatively coupled to the controller and the mobile computing device and to the computing devices running the application's services.

Further disclosed and described herein is a system for testing a control system requiring one technician. In one aspect the system comprises a control system including a controller and a field device, wherein the field device is communicatively coupled to the controller and is positioned at a remote distance from the controller; a mobile computing device running an application for testing the control system, wherein the application provides an interface that allows a technician to control or monitor the controller while observing the field device or while applying a field signal to the field device; and a cloud computing system that is communicatively coupled to the controller and the mobile computing device, wherein the cloud computing system provides the application with cloud services to communicatively couple the mobile computing device and the controller and to store test results in a cloud storage.

Alternatively or optionally, the system may further comprise one or more computers communicatively coupled to the cloud computing system and running a dashboard application that utilizes cloud services to access test results.

In some instances, the mobile computing device comprises a mobile phone, a tablet, and the like.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The accompanying drawings, which are incorporated in and constitute a part of this specification, illustrate embodiments and together with the description, serve to explain the principles of the devices, methods and systems:

FIG. 2E illustrates an exemplary representation of a faceplate rendered by an application running on a mobile computing device for testing a field device input to a control system;

FIG. 2F illustrates an exemplary representation of a faceplate rendered by an application running on a mobile computing device for testing an output from a control system to a field device;

DETAILED DESCRIPTION

Figure 1:
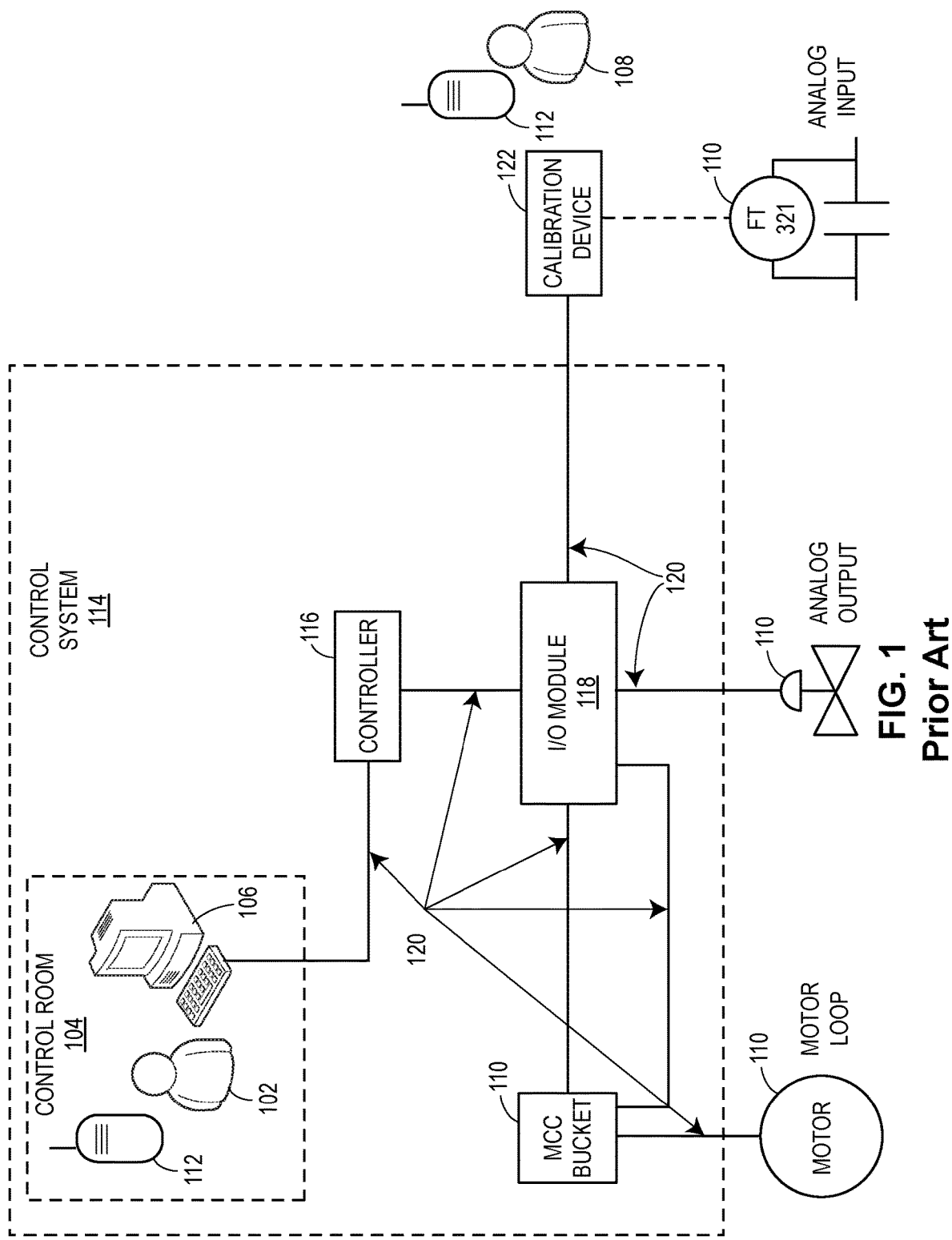
FIG. 1 schematically depicts a current method to perform function tests of control system inputs and outputs.

Before the present methods and systems are disclosed and described, it is to be understood that the methods and systems are not limited to specific methods and/or specific components. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. Furthermore, all or portions of aspects of the disclosed can be implemented using cloud-based processing and storage systems and capabilities. One such non-limiting example of a cloud-base service that can be used in implementations of the disclosed is GE Predix™, as available from the General Electric Company (Schenectady, N.Y.). Predix™ is a cloud-based PaaS (platform as a service) that enables industrial-scale analytics for asset performance management (APM) and operations optimization by providing a standard way to connect machines, data, and people.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed and described herein are systems and methods for one-technician documentation check out, visual inspection and testing of a control system.

Control systems within an industrial facility may be configured to communicate with a distributed set of network connected devices, services, and platforms using an industrial internet network. For example, web applications hosted on a cloud computing system can be offered as services to allow a user to interact with the cloud-enabled control systems using applications running on a user's local device such as a mobile phone, tablet, desktop computer, and the like. This interaction can increase the convenience and efficiency of many tasks associated with the control system. One such task is testing and/or commissioning the control system.

Testing a control system in an industrial facility has typically required two test technicians because a controller and a field device controlled by a controller are remotely spaced. For example, testing an input to the controller typically requires one technician, located proximate to the field device, to apply an input signal (i.e., field signal) at a field device. At the same time, a second technician located proximate to the controller monitors a controller value returned by the controller in response to the applied field signal. It should be noted, the term "proximate" may be understood as within a distance suitable for physical interaction and/or visual inspection.

In another example, testing an output of the controller typically requires one technician, located proximate to the controller, to input a controller value into the controller. At the same time, a second technician, located proximate to the field device, monitors a response. The response may include the state of the field device and/or a value measured/observed at the field device.

To organize and perform control-system tests, the two technicians typically communicate using communications devices. Accordingly, the results of the tests are typically recorded manually and are communicated to others after the tests have been completed. To improve this process, the present disclosure embraces a cloud-enabled controller and a mobile test application running on a mobile computing device used by a test technician. The mobile test application and associated services allows one technician, instead of two, to perform the tests described above. The connectivity of the devices in the test to a cloud computing system allows the results to be automatically recorded and for others to observe the test results and progress.

Figure 2A:
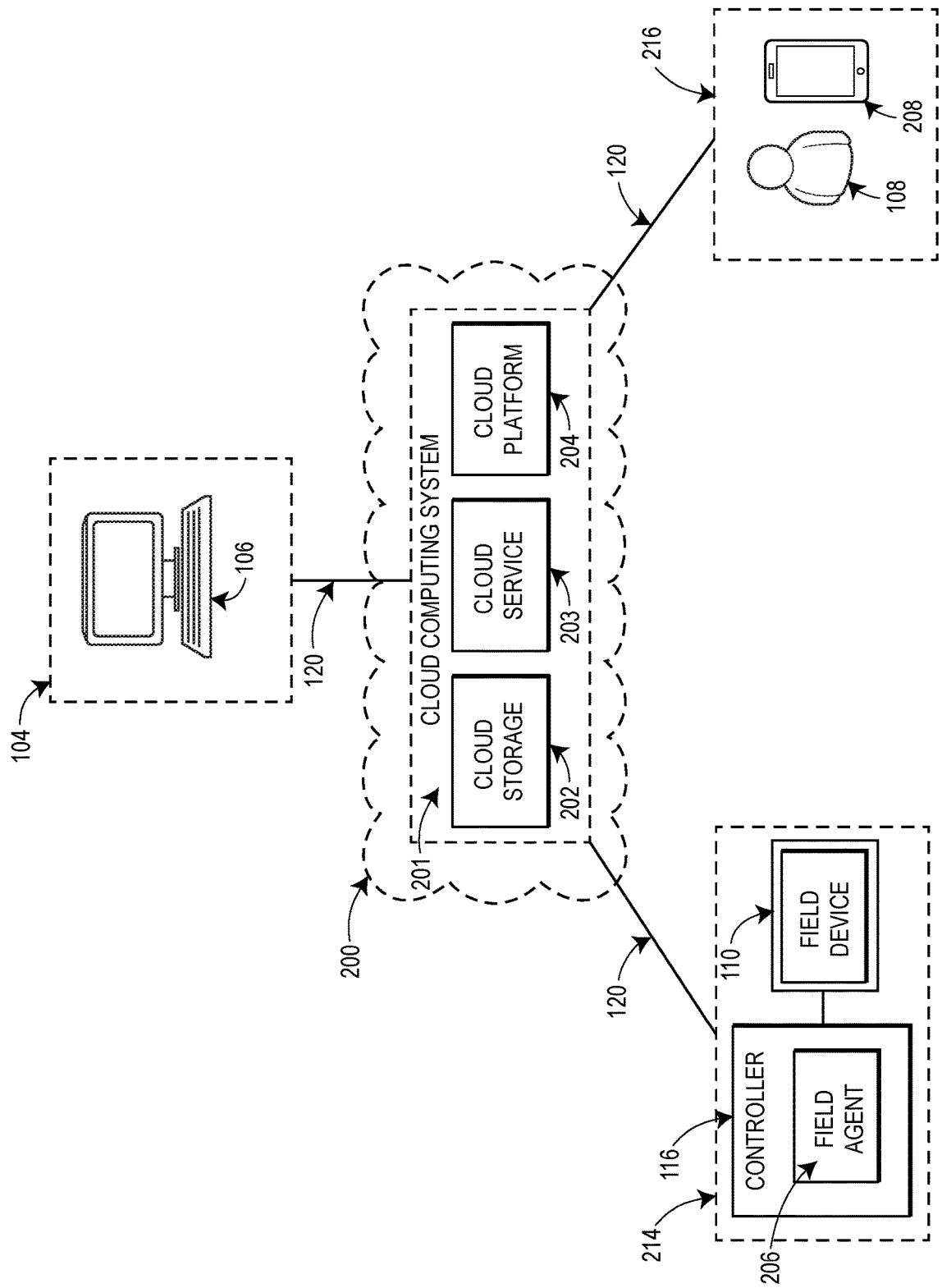
FIGS. 2A and 2B schematically depicts a test of a control system input that is facilitated by a mobile application according to an implementation of the present disclosure.
Figure 2B:
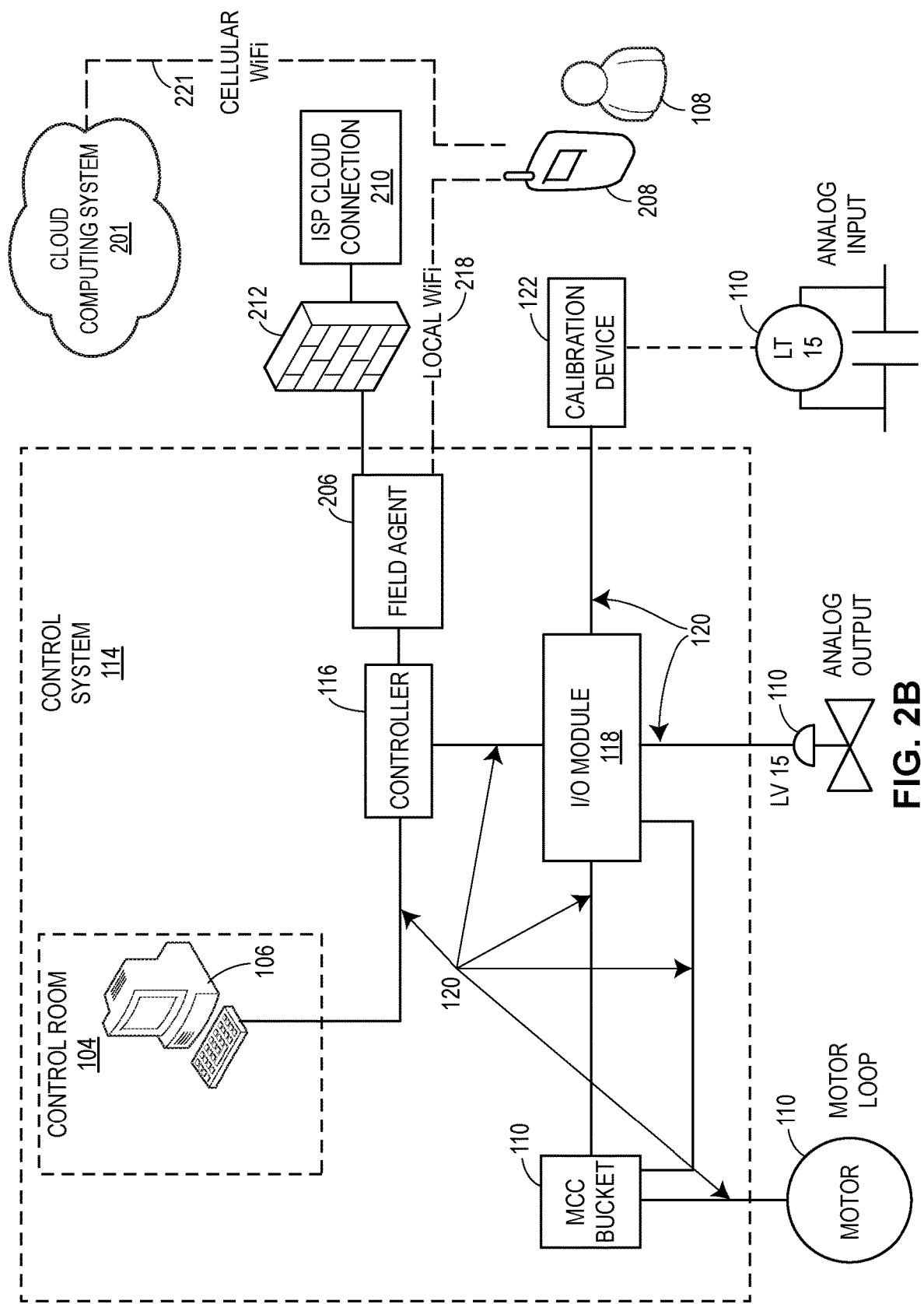

FIGS. 2A and 2B schematically illustrate an exemplary cloud-enabled control system that facilitates remote interaction and monitoring. The system includes several computing environments.

One computing environment 200 includes a cloud computing system 201. The cloud computing system 201 may include distributed (networked) resources that are made widely available via communications connections 120 such as internet connections, wireless fidelity ((WiFi), IEEE Standard 802.11n, where "n" indicates a version number, said standard incorporated by reference) connections, cellular connections, and the like. The resources may include a cloud storage 202, a cloud service 203 (e.g., web applications), and/or a cloud platform 204 (e.g., Predix™ operating system).

Another computing environment 216 includes a mobile computing device 208 such as a smart phone, a tablet, a laptop computer, and the like. The mobile computing device 208 may include a mobile application that, when executing, provides a Technician B 108 an interface (e.g., a GUI) with which the Technician B 108 may interact with the cloud computing system 201 and/or the industrial internet control system 114 using wireless connections such as WiFi and/or cellular.

Another computing environment 214 includes controller 116. The controller 116 may communicate with one or more field devices 110 using a machine-to-machine protocol (e.g., OPC UA. ProfiNet, etc.). This computing environment further includes a field agent 206. The field agent 206 may be incorporated within and comprise software instructions stored in a memory of the controller 116 and executed by a processor of the controller 116 and may enable the controller 116 to communicate with the cloud computing system 201 and/or the mobile computing device 208 (using locally available WiFi). In other instances, the field agent 206 may comprise a stand-alone device having its own memory and/or processor, or comprise other devices that include a processor. In some instances the field agent 206 connects with the cloud computing system 201 through an internet service provider (ISP) cloud connection 210. The connection to the cloud computing system 201 may optionally include a firewall 212 for security purposes.

Optionally, another computing environment comprises the control room 104, which may include the workstation 106 (e.g., a desktop, a laptop, and the like). The workstation 106 may run an application that provides a user (e.g., a project manager, a supervisor, an operator, etc.) an interface that allows the user to interact with the industrial internet control system 114 and/or the cloud computing system 201.

In regard to documentation checkout, there may exist in the cloud computing system an as-designed representation of the field instrumentation that comprises the control system 114. This as-designed representation is sometimes referred to as an instrument index. The instrument index may be created using workstation 106, or it can be transferred to the cloud computing system 201 and/or the industrial internet control system 114. For example, an engineering, procurement and construction (EPC) company may create the instrument index and transmit it to the cloud computing system 201 where it is stored in cloud storage 202. The instrument index may have various forms. It may be comprised of one or more of spreadsheets, process flow diagrams (PFDs), piping and instrument diagrams (P&IDs), loop diagrams, and combinations thereof.

In a system configuration file of the control system 114, there is an "as-installed" representation of the field instrumentation that comprises the control system 114. 'As installed' is typically stored in tools used to configure the control system 114 or within the control system 114 itself. In one aspect, the "as-installed" configuration is uploaded to the cloud computing system and one of the cloud services 203 residing in the cloud computing system 201 compares the "as-installed" configuration to the as-designed instrument index and alerts engineers and technicians to any discrepancies. A web-based interface (can be a web browser or native mobile device application) can be used to render the results of the comparison. In one aspect, one of the cloud services 203 residing in the cloud computing system 201 cab assist engineers and technicians to resolve documentation discrepancies through automated workflows and cab stores the resolved instrument index as the verified design documentation in cloud storage 202 in the cloud computing system 201.

The verified design documentation is considered the source of the truth for functional testing. For example, the web-based interface can provide indication status in the form of a dashboard of any remaining discrepancies between the as-designed and as-built instrument configuration and generate warnings to the application executing on the mobile computing device 208 if unverified design documentation is used to perform any further testing, including functional testing.

Visual inspection occurs when verified design documentation stored in cloud storage 202 in the cloud computing system is used by a technician to ensure that the field devices 110 that comprise the control system 114 are installed per the as-designed documentation. The technician can locate specific field devices 110 and, using the application executing on the mobile computing device 208, bring up drawings from the verified design documentation that has been stored in cloud storage 202 and check the specific field devices 110 to see if they are installed correctly. In some instances, using the application executing on the mobile computing device 208, (if the mobile computing device 208 has a camera), they can take a picture of the installation as proof. The camera can be used to capture an image of the field device and/or wiring terminations to and from the field device 110 and the captured image can be transmitted to the cloud computing system 201 by the mobile computing device 208 and stored in the cloud storage 202. A method for providing design documentation via the cloud to technicians to assist in the visual inspection of field instrumentation is also facilitated. The method comprises receiving, by a cloud computing system 201, an instrument index that represents the control system 114 and a loop diagram of at least a portion of the control system 114 and rendering those on the mobile computing device 208. The technician can use these documents to determine whether the field instruments are labeled correctly and terminated correctly in the field to the associated hardware component. Alternatively or optionally, the technician can use the application executing on the mobile computing device 208 to document the results of the visual inspection and whether remedial actions are necessary.

Figure 2C:
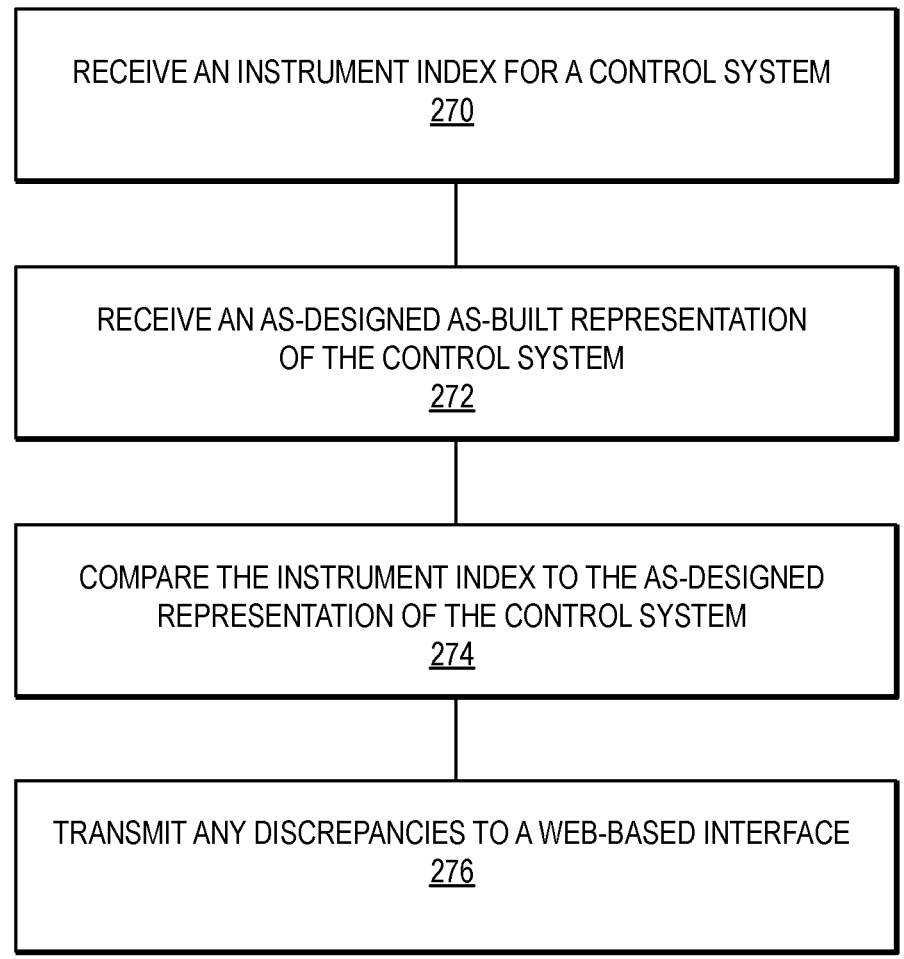
FIG. 2C is a flowchart that illustrates an exemplary method for a one-technician function test for documentation check of a cloud connected control system.

FIG. 2C is a flowchart that illustrates an exemplary method for documentation check of a cloud connected control system by a single technician. The method comprises 270, receiving, by the cloud computing system 201, the instrument index that represents the control system 114, and storing the instrument index in the cloud storage 202 associated with the cloud computing system 201. The instrument index is an as-designed representation of the control system 114. At 272, the as-built representation of the control system 114 is received by the cloud computing system 201. In some instances, the as-built representation of the control system 114 may be received from the control system 114. At 274, one of the cloud services executing on the cloud computing system 201 compares the instrument index with the as-built representation of the control system 114 to determine if a discrepancy exists between the instrument index and the as-built representation of the control system 114. If, at 276, the discrepancy exists between the instrument index and the as-built representation of the control system 114, the discrepancy is transmitted to a web-based interface. In some instances, transmitting the discrepancy to the web-based interface may comprise transmitting the discrepancy to the mobile computing device 208 wherein the application executing on the mobile computing device 208 provides an indication of the discrepancy. For example, the application executing on the mobile computing device may render a graphical user interface that provides a visual display of the discrepancy.

Though not shown in FIG. 2C, the method may further comprise correcting the discrepancy and creating the verified design documentation for the control system 114. The verified design documentation can be stored in the cloud storage 202 of the cloud computing system 201. Now having the verified design documentation, a technician performing any additional testing or inspection of the control system 114, such as function testing, can be provided a warning if the verified design documentation is not being used for the testing and/or inspection. For example, the verified design documentation of the control system 114 can be provided via the cloud computing system 201 to one or more technicians to assist in the visual inspection of one or more field devices that comprise the control system 114 by rendering, on the mobile computing device, a loop diagram of at least a portion of the control system 114. The rendered loop diagram including one or more of the field devices, wherein the one or more technicians use the loop diagram to determine whether the one or more field devices are labeled correctly and terminated correctly.

Figure 2D:
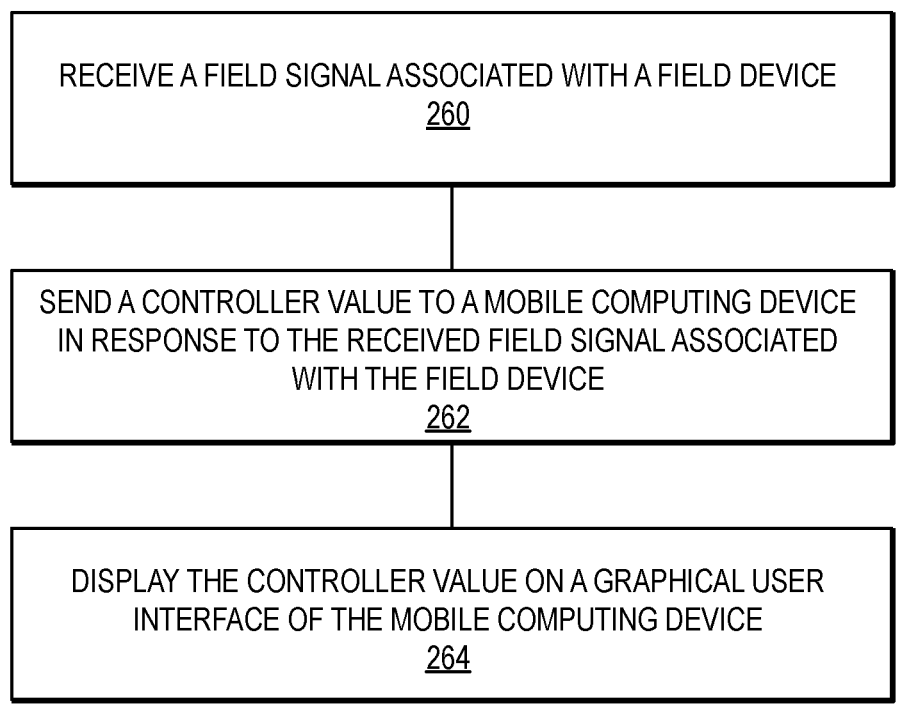
FIG. 2D is a flowchart that illustrates an exemplary method for a one-technician function test of an input from a field device.

Referring now primarily to FIGS. 2B and 2D, an exemplary method for a one-technician function test of an input from the field device 110 is described. Overall, the Technician B 108 in the field using a calibration device 122 injects a signal into the industrial internet control system 114 that is representative of one of the values of the exemplary field device 110 LT 15, for example a 12 mA signal. The Technician B 108 looks on his mobile computing device 208 to see if the signal just injected represents 12 mA in scaled engineering units on the controller 116. If the value matches, the test passes and that information is sent to the cloud computing system 201 automatically where it may be viewed in a web dashboard.

Generally, the method comprises 260 receiving, by the controller 116 over an I/O network, a field signal that is associated with the field device 110. The field signal may be created by the calibration device 122, or it may be generated by the field device 110. The field device 110 is normally communicatively coupled to the controller 116 through the I/O network. As used herein, "normally" (in reference to the field device 110) means in its conventional operating state. For example, while the field device 110 may be normally communicatively coupled with the I/O network, it may be unconnected from the I/O network to perform the methods described herein. The field device 110 and the controller 116 are remotely spaced, meaning that they are of a sufficient distance apart from one another that conventional testing would require two technicians. In response to the field signal sent by the field device 110 to the controller 116 over the I/O network, at 262 the controller 116 sends a controller value for the field device 110 from the controller 116 to the mobile computing device 208 located proximate to the field device 110. The mobile computing device 208 executes an application that interfaces with the controller 116 through a wireless network. The wireless network may comprise local wireless internet 218, or it may comprise cellular/WiFi communications 221 that access the cloud computing system 201. At 264, the controller value is displayed on a graphical user interface rendered by the application running on the mobile computing device 208.

In one aspect, the Technician B 108, upon seeing the controller value displayed on the graphical user interface rendered by the application running on the mobile computing device 208, can enter a function test results indication for the controller value for the field device 110 returned from the controller 116 in response to the field signal. The function test results indication indicates validation or non-validation of the controller value for the field device 110 returned from the controller 116 in response to the field signal. Validation of the controller value for the field device 110 returned from the controller 116 in response to the field signal may indicate an acceptable value, scale and engineering units for the controller value for the field device 110 returned from the controller 116 in response to the field signal. Non-validation of the controller value for the field device 110 returned from the controller 116 in response to the field signal indicates that at least one of the value, scale or engineering units of the controller value for the field device 110 returned from the controller 116 in response to the field signal are unacceptable.

The method may further comprise transmitting, using the mobile computing device 208 running the application, one or more of the function test results indication for the controller value for the field device 110 returned from the controller 116 in response to the field signal and the controller value for the field device 110 returned from the controller 116 in response to the field signal to a cloud computing system 100 for storage in cloud storage 202.

A specific example of a one-technician function test of an input from the field device is described. The example comprises the Technician B 108 causing the application on the mobile computing device 208 to execute and open the checkout faceplate for LT 15, which is displayed in the graphical user interface of the mobile computing device 208. FIG. 2E illustrates an exemplary representation of this faceplate.

The Technician B 108 then sets the output of the calibration device 122 to 4 mA and records the faceplate's displayed value in the application executing on the mobile computing device 208 by, for example, clicking on the "Record" button next to the displayed 4 mA results. The displayed value in the faceplate is the returned controller value that corresponds to the 4 mA field signal received by the controller 116. The Technician B 108 should be aware of any signal characterization during the function check, such as square root extraction or compensation, so that results are not misconstrued. The Technician B 108 repeats these steps for any other desired input values (e.g., 8 mA, 12 mA, 16 mA and 20 mA). As the Technician B 108 steps through the range of inputs any alarm signals associated with the measured value are verified and results recorded in the application executing on the mobile computing device 208. After recording the results for all the values tested for the analog input field device 110 (LT 15), the technician disconnects the calibration device 122 and reconnects the field wires to field device 110 LT_15.

Another function test that can be performed is a one-technician function test of an output from the control system 114 to the field device 110. Generally, the method comprises setting an output of the controller 116 to a controller value using the mobile computing device 208 located at a remote analog output field device 110 that is communicatively coupled to the controller through the I/O network. The mobile computing device executes an application that interfaces with the controller 116 through a wireless network. The wireless network may comprise local wireless internet 218 that is communicatively coupled to the controller 116 and the mobile computing device 208, or it may comprise cellular/WiFi communications 221 that access the cloud computing system 201. The method further comprises receiving, by the field device 110, the set output from the controller 116. The set output is received by the field device 110 through the I/O network. In one instance, the Technician B 108 observes the response of the field device 110 to the set output. The technician enters an indication of the observed response of the field device 110 to the set output of the controller 116 in the application executing on the mobile computing device 208. This may involve entering a value corresponding to the observed response of the field device 110 into the graphical user interface rendered by the application running on the mobile computing device 208. In another instance, the response of the field device 110 to the set output of the controller 116 is measured, using a sensing device, the measurement can be entered into the graphical user interface rendered by the application running on the mobile computing device 208 by the technician or it may be transmitted from the sensing device to the mobile computing device 208. Results of the test may be transmitted to the cloud computing system 201 and stored in cloud storage 202 by the application running on the mobile computing device 208.

In some instances the method may further comprise comparing the observed response of the field device 110 to an expected response to test a function of the control system 114, and transmitting, using the mobile computing device 208, the results of the comparison to the cloud storage 202 in the cloud computing system 201.

A specific example of a one-technician function test of an output from the control system 114 to the field device 110 is described. The example comprises the Technician B 108 proceeding to an analog output field device 110, valve LV 15. The Technician B 108 continues to use the application executing on the mobile computing device 208 and opens a checkout faceplate for analog input field device 110 LV 15. An exemplary representation of this faceplate is shown in FIG. 2F.

The Technician B 108 enters a forced controller value of, for example, 0% in the checkout faceplate of the application executing on the mobile computing device 208 for the command to the valve. The entered controller value is transmitted from the mobile computing device 208 to the controller 116 of the control system 114 either though the field agent 206 using local wireless internet access (WiFi) or through the cloud computing system 201 through wireless cellular or WiFi 221. The Technician B 108 observes the valve stem or shaft indication on the valve and enters the observed position in the checkout faceplate of the application executing on the mobile computing device 208. The Technician B 108 continues through the range of test values and then indicates that the test is done by clicking on a button such as a "Record Results" button in the application executing on the mobile computing device 208.

Figure 2G:
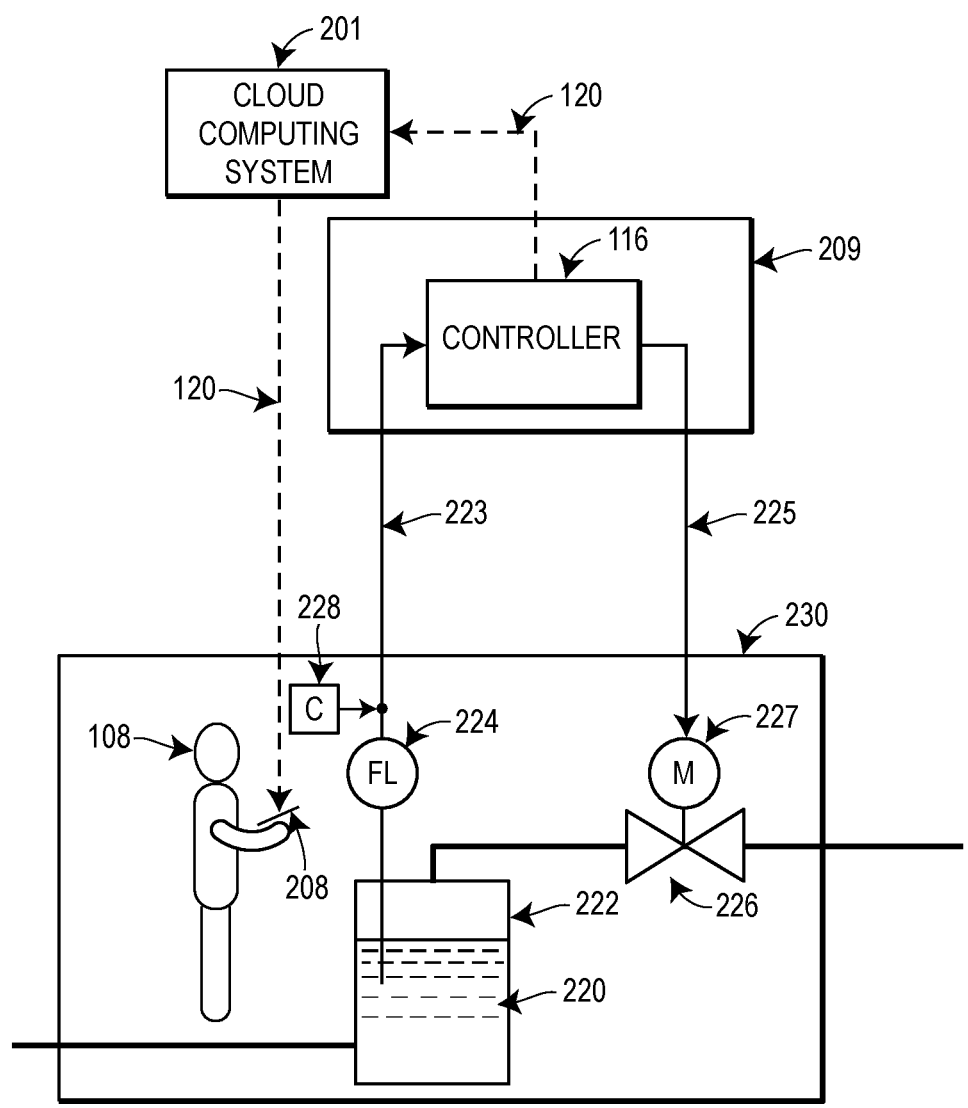
FIG. 2G schematically depicts an alternate test of an input to an exemplary cloud-enabled control system such as that shown in FIGS. 2A and 2B that is facilitated by the mobile application according to an implementation of the present disclosure.

FIG. 2G schematically depicts an alternate test of an input to an exemplary cloud-enabled control system such as that shown in FIGS. 2A and 2B that is facilitated by the mobile application according to an implementation of the present disclosure. The exemplary control system includes controller 116, which can be used for controlling the amount of fluid 220 in a reservoir 222. An input 223 to the controller 116 is connected to the field device 110 such as fluid-level sensor 224 installed with the reservoir 222. An output 225 of the controller 116 is connected to another field device 110 such as valve 226 having a motorized valve positioner 227. In operation, a fluid level measured by the fluid-level sensor 224 causes the controller 116 to transmit a signal to open/close the valve 226 by an amount based on the fluid level measured by the fluid-level sensor 224.

The input 223 to the controller 116 may be tested by simulating a signal from the fluid-level sensor 224 at the input 223 and then observing the response of the controller 116. To accomplish the simulation, the Technician B 108 may inject a signal at the input 223 to the controller 116 using a calibration device (i.e., calibrator) 122 that is electrically connected in place of (or in addition to) the field device 110 such as the fluid-level sensor 224 shown in FIG. 2G. The injected signal represents a signal expected from the fluid-level sensor 224 for a particular fluid level. After injection, the Technician B 108 may observe the output 225 of the controller 116 to determine if the system responds as expected to a given input 223 to the controller 116. Because the controller 116 is located in an area 209 remotely spaced from an area 230 proximate to the fluid-level sensor 224, the Technician B 108 interfaces with the controller 116 using the mobile application executing on the mobile computing device 208 in order to observe the response of the controller 116. In the embodiment shown in FIG. 2G, the controller interfaces with the cloud computing system 201 through a field agent 206 embedded within the controller 116. It is to be appreciated that the same results may be obtained with a stand-alone field agent 206, which is contemplated within the scope of this disclosure.

The Technician B 108 may monitor the controller value at the output 225 of the controller 116 using the mobile application running on the mobile computing device 208. The mobile application interfaces with the cloud service 203 running on the cloud computing system 201 to obtain the controller value from the controller 116. In other words, rather than physically monitoring/measuring the output 225 of the controller 116, the controller 116 provides the controller value to the cloud computing system 201. Using the mobile application on the mobile computing device 208 that interfaces with the cloud service 203 running on the cloud computing system 201, the Technician B 108 can see the controller value on the mobile application. As a safety check or for redundancy, the technician can also physically measure/monitor the output 225 of the controller 116.

Figure 3:
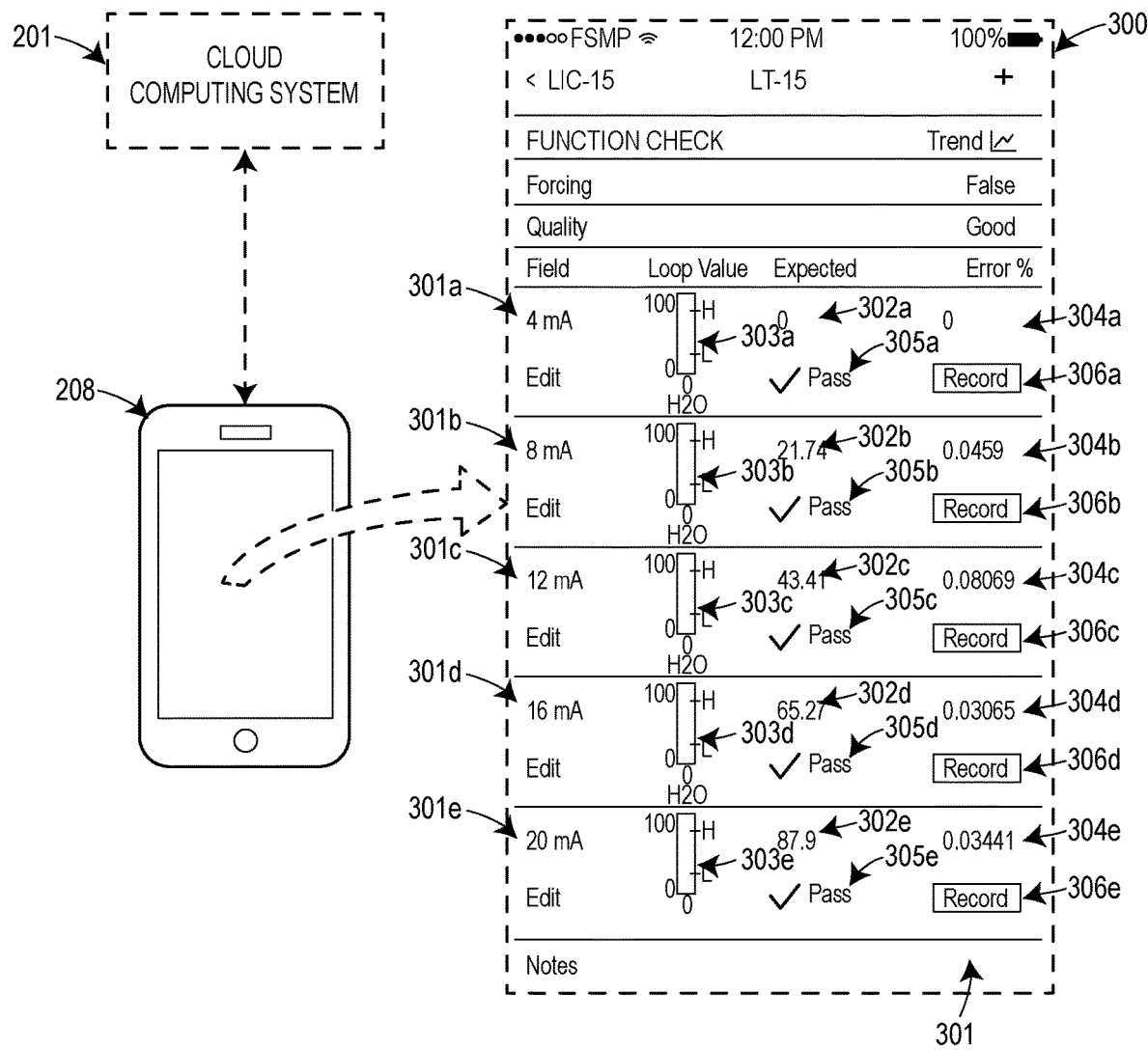
FIG. 3 graphically depicts a GUI of the mobile application for testing the control system input according to an implementation of the present disclosure.

FIG. 3 graphically depicts an exemplary screen shot 300 for the mobile application running on the mobile computing device 208 to facilitate the test shown and described in relation to FIG. 2G. As shown, the exemplary screen shot 300 includes a plurality of field values 301a-e. The exemplary screen shot 300 also includes expected controller values 302a-e corresponding to each field value 301a-e. The field values 301a-e may be retrieved from cloud storage 202 in the cloud computing system 201 for the field device 110 being tested. The Technician B 108 may apply the field values 301a-e one at a time to the input 223 of the controller 116 using the calibration device 122. Alternatively, the Technician B 108 may cause the fluid-level sensor 224 to deliver the field values 301a-e. The Technician B 108 may then observe the controller's response 303a-e to each field value 301a-e using the mobile application. The controller's response 303a-e may be displayed in the mobile application in a tabular and/or graphical format.

The mobile application may also automatically compare the controller's response 303a-e to the expected values 302a-e and return a result of the comparison. For example, a deviation 304a-e (e.g., percent error) between the measured controller value 303a-e and the expected controller 302a-e may be computed and displayed. Further, the deviation may be compared to a threshold to determine a pass/fail result 305a-e.

Figure 5:
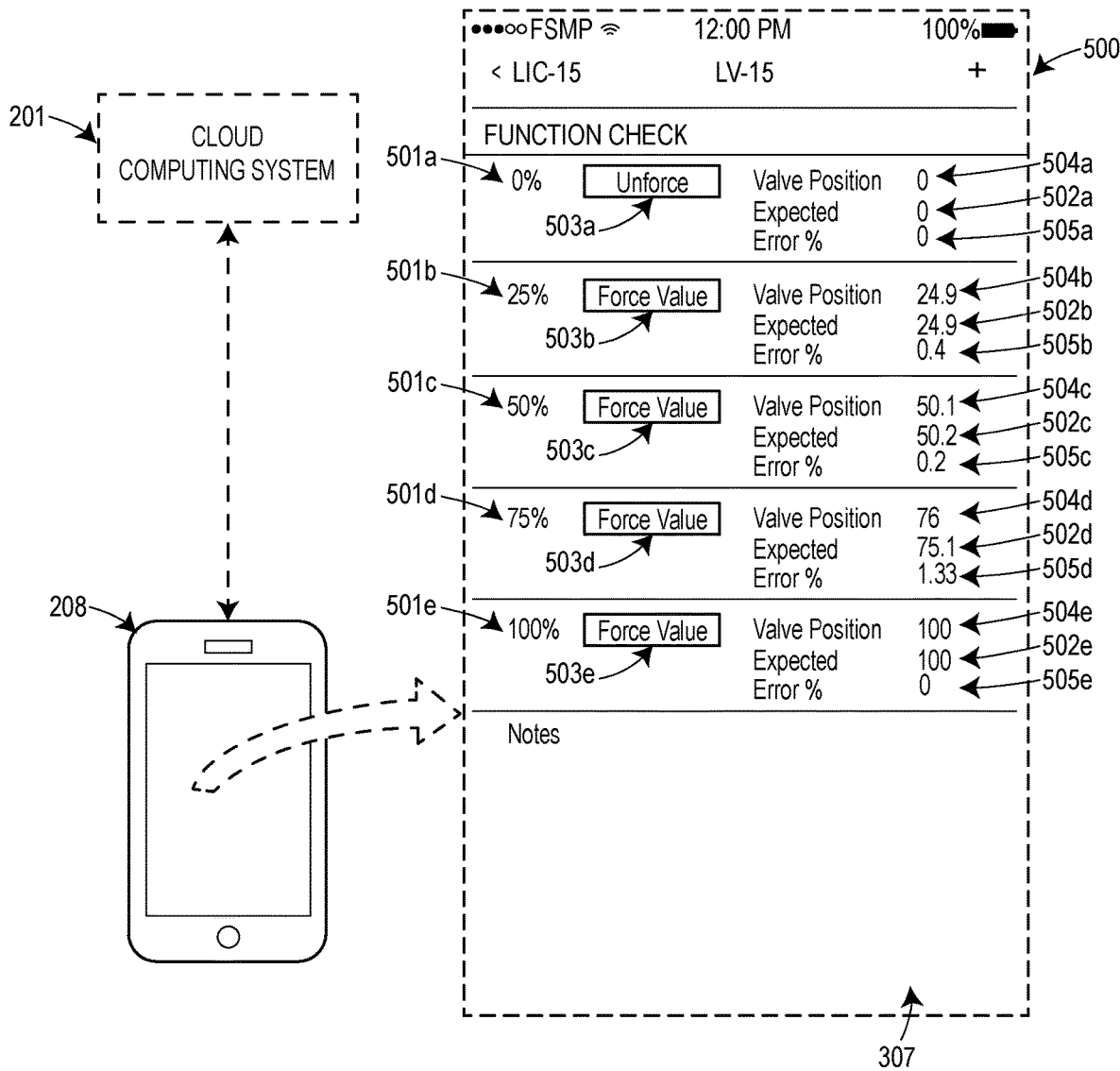
FIG. 5 graphically depicts a GUI of the mobile application for testing control system output according to an implementation of the present disclosure.

As shown with reference to FIG. 5, the mobile application may also accommodate the entry of text/numbers into a field 307 to record observed values or to record notes. In some embodiments, the mobile application may also accommodate the capturing of audio, images, or video corresponding to the test.

The mobile application may also accommodate controls to interact with test data and/or cloud services 203. For example, the results of each test may be recorded in cloud storage 202 by pressing a virtual record button 306a-e. Because the test results are recorded to the cloud computing system 201, another user with access to the cloud computing system 201 and/or cloud storage 202 may immediately access the test results and observe the test results and/or test progress in real time.

Figure 4A:
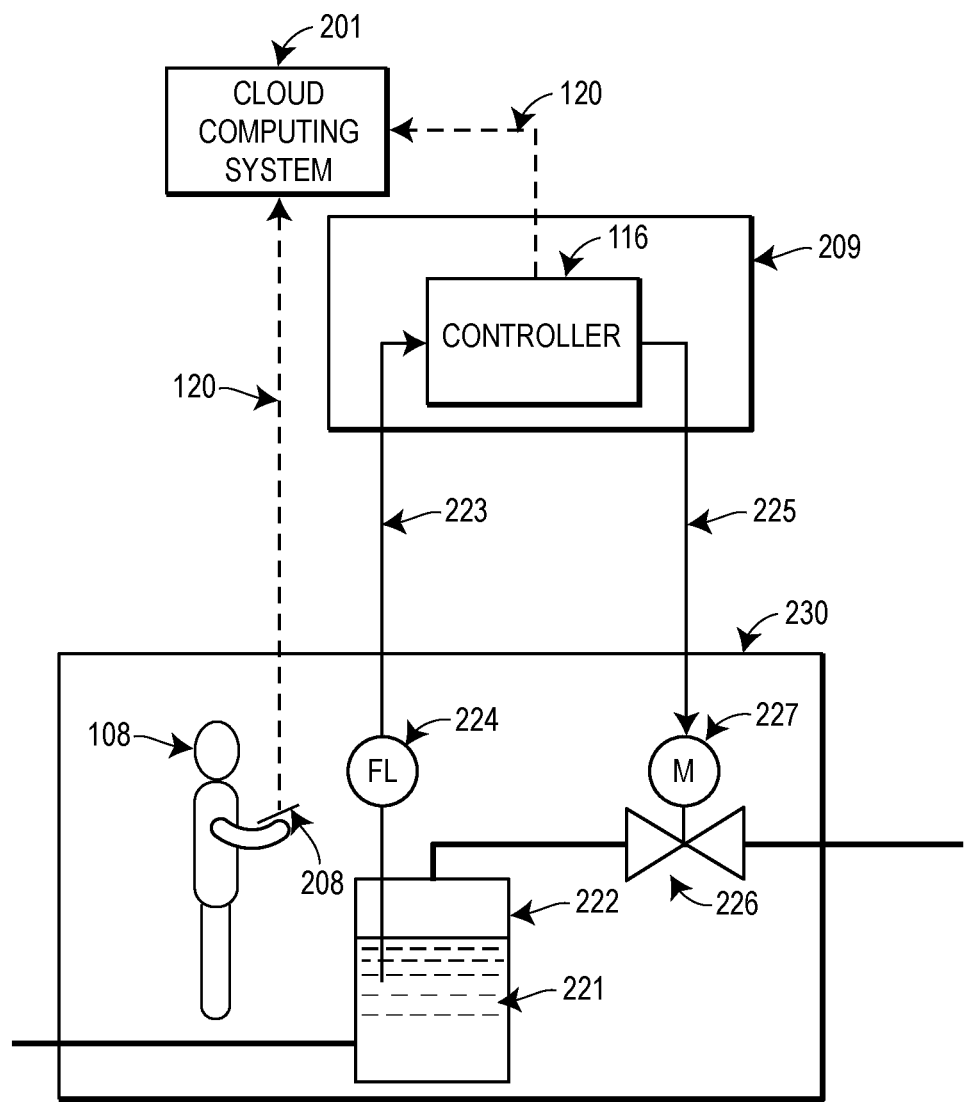
FIG. 4A schematically depicts a test of a control system output that is facilitated by the mobile application according to an implementation of the present disclosure.
Figure 4B:
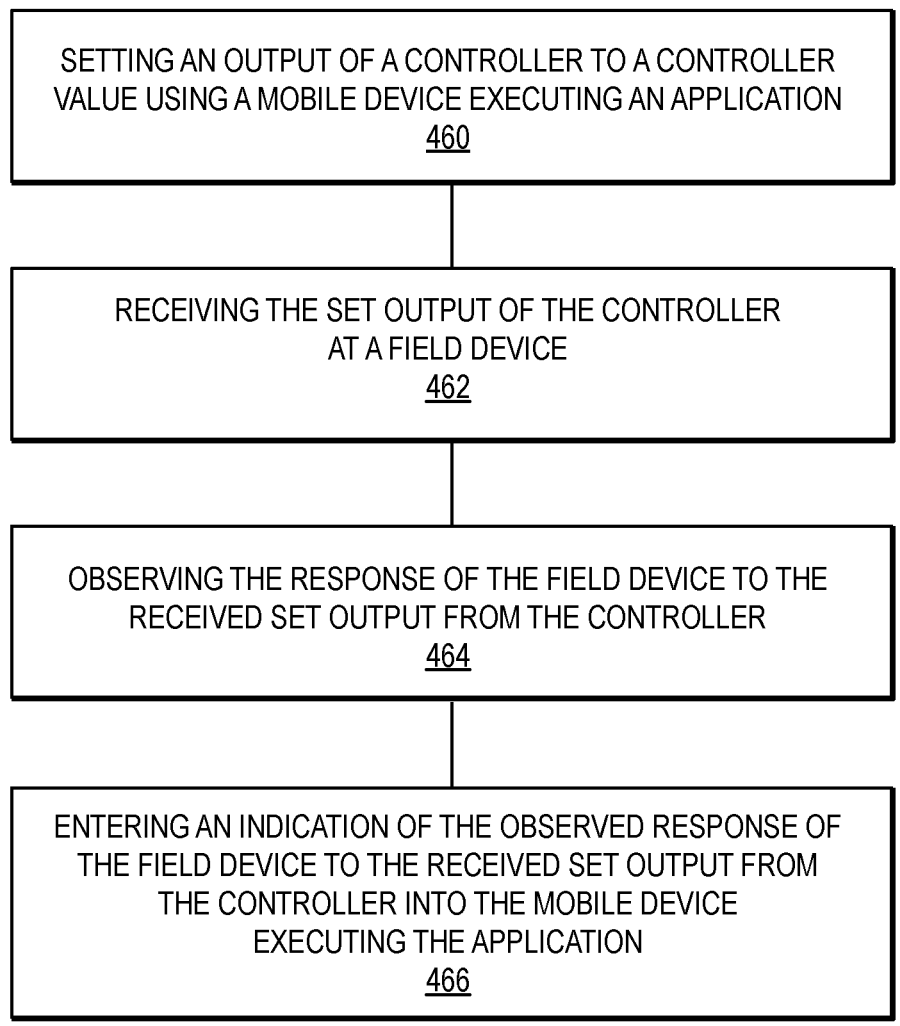
FIG. 4B is a flowchart that illustrates an exemplary method for one-technician function testing of an output from a controller of a control system to a field device.

FIGS. 4A and 4B graphically illustrate a method of testing the output 225 of an exemplary cloud-enabled control system such as that shown in FIGS. 2A and 2B. The output 225 of the exemplary control system may be tested by 460 setting the controller 116 to generate an output signal and then observing the response of the field device 110 such as the motorized valve positioner 227. At 462, the Technician B 108 may use the mobile application executing on the mobile computing device 208 to set the output 225 of the controller 116 to a controller value that corresponds to a particular position of the valve 226. After setting the output 225 of the controller 116, the Technician B 108 may at 464 observe 400 the response of the valve 226 and/or the motorized valve positioner 227. Observed responses may correspond to analog or discrete levels indicated by one or more sensors probing the valve 226, by an instrument used by the Technician B 108 to test the valve 226, or by simple visual and/or manual (touch) observation of the valve 226. At 466, the Technician B 108 can enter an indication of the observed response into the application executing on the mobile computing device 208, which may be transmitted to the cloud computing system 201 for recordation and/or analysis.

Because the mobile computing device 208 and the controller 116 are communicatively coupled to the cloud computing system 201, the Technician B 108 may set (i.e., force) the controller 116 to output a particular controller value using the mobile application and cloud service 203. FIG. 5 graphically depicts an exemplary screen shot 500 of the mobile application for an exemplary output test of the controller 116. As shown, the screen shot 500 presents a plurality of controller values 501a-e for testing. The controller values 501a-e correspond to expected valve positions 502a-e. The controller values for testing 501a-e and the expected valve positions 502a-e may be retrieved from cloud storage 202 of the cloud computing system 201 for the valve 226 under test. The Technician B 108 may set the output 225 of the controller 116 to a particular controller value by pressing or otherwise selecting a virtual button 503*a-e* corresponding to the controller value. Measured valve positions 504*a-e*, each resulting from a set output 225 of the controller 116, may be obtained by the Technician B 108 and recorded using the mobile application. The mobile application and/or cloud service 203 may also analyze the measured valve positions 504*a-e* and return a percent error 505*a-e* between the expected valve positions 502*a-e* and the measured valve positions 504*a-e* to the Technician B 108 via the mobile application. As shown in FIG. 5, a deviation (e.g., percent error) 505*a-e* of the measured valve position from the expected valve position is calculated (e.g., automatically) and displayed. The mobile application may further provide the Technician B 108 with the field 307 to enter notes corresponding to the tests. Test information including notes from the field 307 can be stored in cloud storage 202.

The cloud-enabled control system embodiments and test parameters described thus far are intended to be exemplary and are not intended to be limiting. The instant disclosure envisions the mobile application presenting any combination of reference data (e.g., test requirements, expected values, etc.), measured data (e.g., controller values, observations, etc.), and analysis data (e.g., error, pass/fail, etc.) as part of the input and output testing of a cloud-enabled control system.

The reference data for each test may be presented all at once or in a sequence. For example, the field device 110 may be tested according to a test plan. Reference data corresponding to the test plan, such as controller values and/or expected values, may be stored in cloud storage 202 and retrieved as needed by the mobile application. For example, the reference data may be retrieved manually by the Technician B 108 via the mobile application or may be automatically retrieved by the mobile application as tests in the test plan are completed.

The controller values may be presented in the mobile application in a variety of formats (e.g., graphical, tabular, textual, graphs, charts, colors, audio, video, etc.). Analysis data may obtained using any mathematical comparisons and/or calculations (e.g., percent error, comparison to a threshold, normalization, etc.). The comparisons and/or calculations may be performed by the mobile computing device 208, by the cloud computing system 201, or combination thereof. The analysis data may be presented in a variety of formats (e.g., graphical, tabular, textual, graphs, charts, colors, audio, video, etc.).

Figure 6:
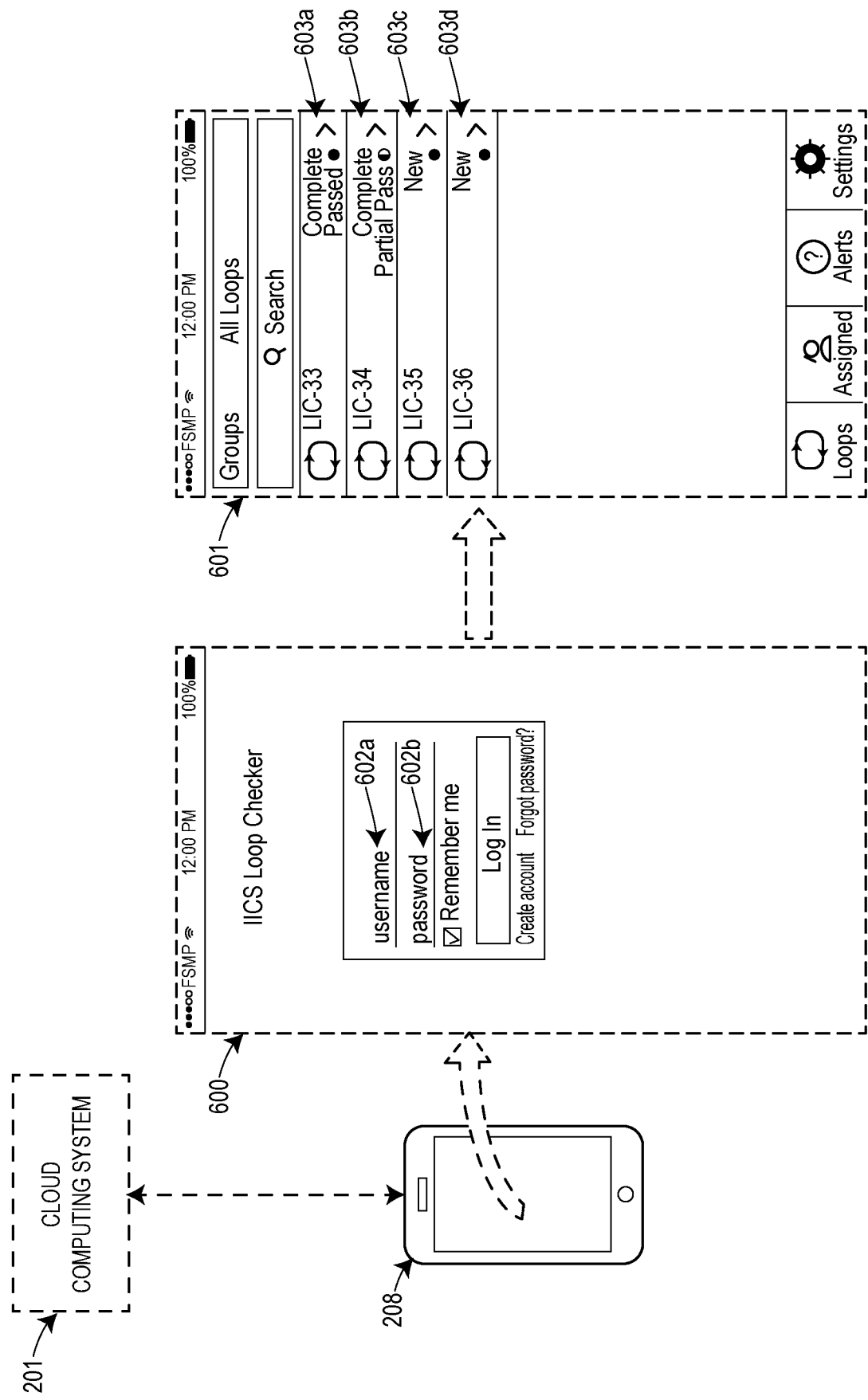
FIG. 6 graphically depicts screen shots of the mobile application that are consistent with aspects of the control system test according to an implementation of the present disclosure.

The mobile application may also include other features related to security and testing. FIG. 6 shows several screen shots from the mobile application illustrating the starting point for a control system test in an exemplary embodiment. A security screen 600 is presented for the Technician B 108 to access the cloud service 203 and cloud storage 202 of the cloud computing system 201. The mobile application may capture a user login 602*a-b* or biometrics to insure that the Technician B 108 has the appropriate credentials to proceed with testing. In some cases, the login identifies the Technician B 108 so that timely data corresponding to the Technician B 108 is delivered to the technician's mobile application. For example, after login the mobile application may present a summary of the commissioning progress 601. As shown in FIG. 6, the summary may include a plurality of tests associated with the commissioning and the status for each test 603*a-d*. To proceed with testing, the Technician B 108 may select a particular test from the list. Furthermore, levels of authorization may be assigned to a Technician B 108 based on login credentials. Similarly, sections of a test plan for the cloud-enabled control system may be assigned to a Technician B 108 based on login credentials.

The commissioning of a facility or a system may include a plurality of tests in addition to the input and output tests described previously. For example, the commissioning may require the verification of the control system's documentation as described above and herein. Such control system documentation may originate from the instrument index.

Figure 7:
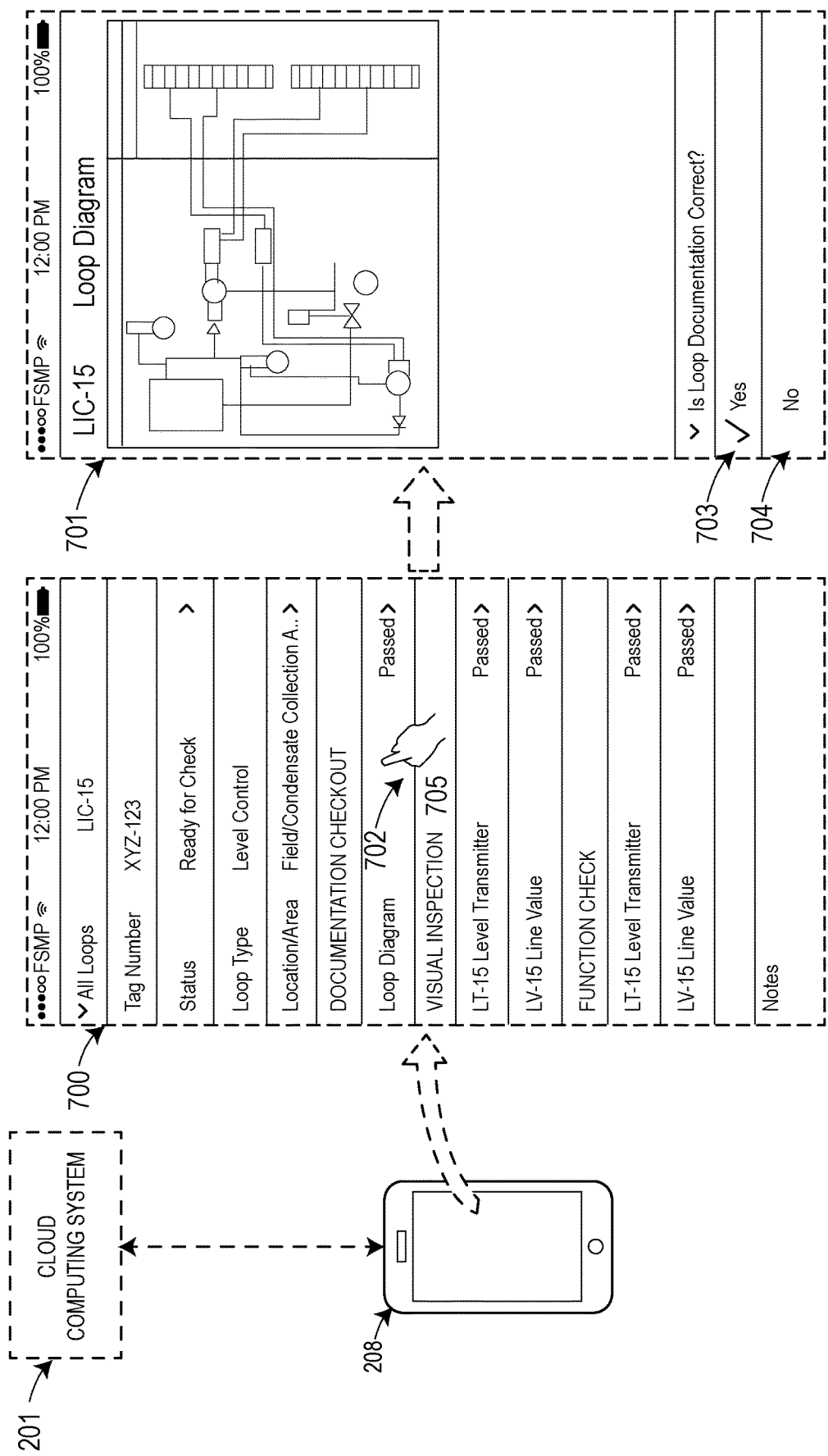
FIG. 7 graphically depicts screen shots of the mobile application that are consistent with aspects of the control system test according to an implementation of the present disclosure.

FIG. 7 illustrates screen shots from the mobile application corresponding to a documentation verification test. During the commissioning, the Technician B 108 may obtain a summary screen 700 for a particular control system or a portion of a control system. The summary screen 700 may include information about the control system (e.g., tag number, status, loop type, location, etc.). The summary screen 700 may also include the tests required for the particular system (e.g., documentation checkout, visual inspection, function check, etc A particular test may be selected with a touch gesture 702. For example, as shown in FIG. 7, the selection of documentation checkout may result in the download and display of a loop diagram 701 that corresponds to the instrument index or a portion of the instrument index. The Technician B 108 may verify the loop diagram 701 matches the installation of the field device. A match may comprise the loop diagram and the corresponding portion of the instrument index are consistent and labeled correctly. If a match is found, the Technician B 108 may indicate in the mobile application that the documentation test passes 703. Similarly, if the Technician B 108 finds that the loop diagram and the corresponding portion of the instrument index are not consistent and labeled correctly, that can be entered into the application as well as the test not passing 704. The results may then be uploaded automatically or manually to cloud storage 202. In addition, the progress of the commissioning may be adjusted to reflect that the documentation verification test for the system has been completed.

Figure 8:
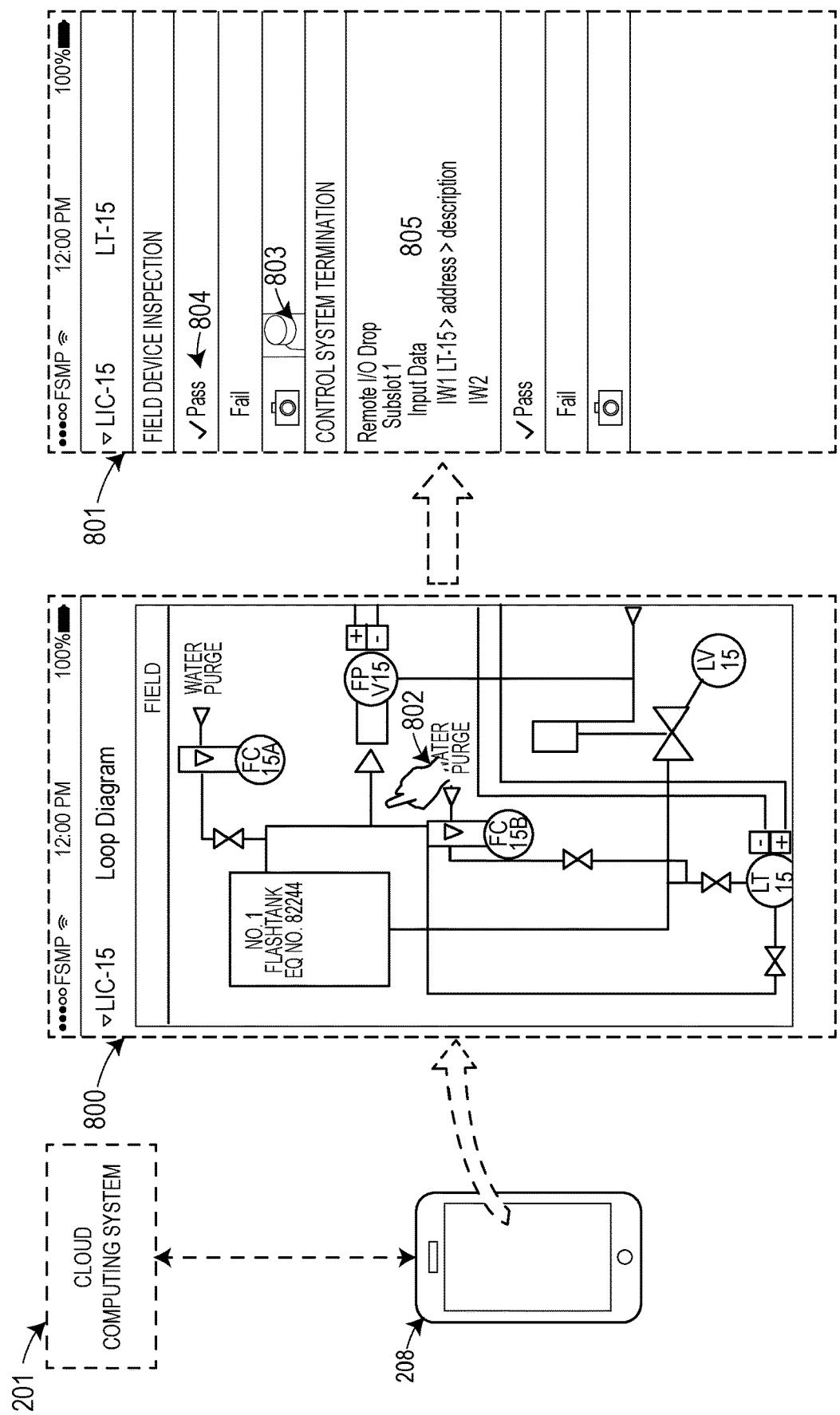
FIG. 8 graphically depicts screen shots of the mobile application that are consistent with aspects of the control system test according to an implementation of the present disclosure.

Returning to FIG. 7, a visual inspection may also be performed using the application executing on the mobile computing device 208. The visual inspection 705 component of the application executing on the mobile computing device 208 is used to confirm a visual inspection of the control system (114, as shown in FIGS. 2A and 2B), represented by the instrument index. As shown in FIG. 8, visual inspection 705 comprises the selection of the field device 802 in a control loop diagram 800 and the application executing on the mobile computing device 208 providing a location of one of the selected field device 802 that comprises a portion of the control loop diagram 800 of the control system 114. The application indicates connections 805 of the input/output (I/O) network to the selected field device 802 and to the control system 114, as defined by the instrument index. The application requests an entry 801 from the Technician B 108 that the one of the field device 802 is installed and connected in accordance with or not in accordance with the instrument index. The application, using the mobile computing device 208, transmits the entry that the field device 802 is installed and connected in accordance with or not in accordance with the instrument index to the cloud computing system 201 and stores it in the cloud storage 202. The visual inspection 705 component also allows an image 803 of the field device 802 to be captured using a cameras associated with the mobile computing device 208 and stored with the visual inspection records.

Figure 9:
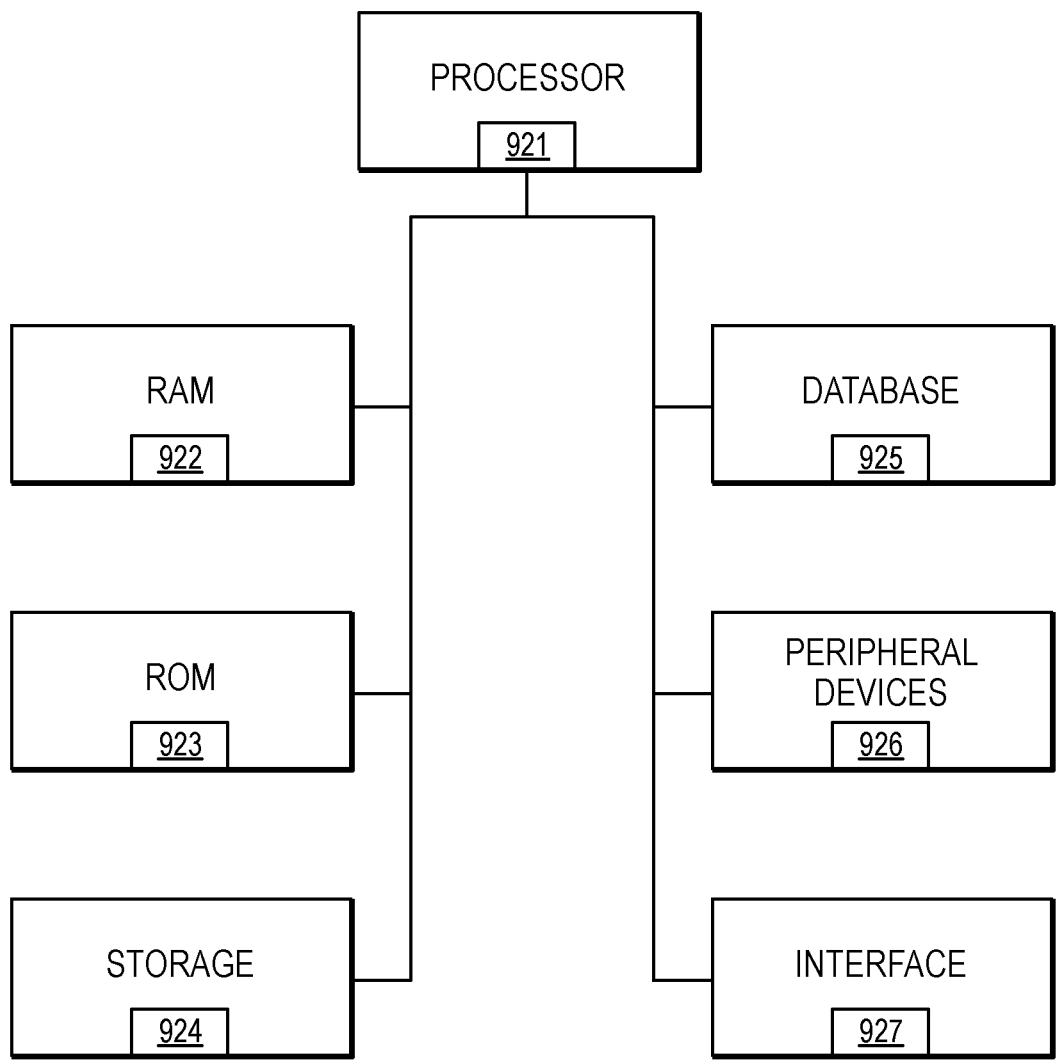
FIG. 9 is a block diagram illustrating an exemplary operating environment for performing the disclosed methods.

FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise network PCs, minicomputers, mainframe computers, controllers, smartphones, field agents, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

The operating environment of FIG. 9 can illustrate an exemplary controller and/or at least a portion of a cloud computing system that can be used for facilitating a one-technician test of a control system. In various aspects, the controller 901 of FIG. 9 may comprise all or a portion of the controller 116 of the cloud-enabled control system shown in FIGS. 2A and 2B, or it may comprise all or a portion of the cloud computing system of FIGS. 2A and 2B, both of which are used for facilitating a one-technician test of the exemplary cloud-enabled control system shown herein. As used herein, "controller" may include a plurality of controllers. The controllers may include one or more hardware components such as, for example, a processor 921, a random access memory (RAM) module 922, a read-only memory (ROM) module 923, a storage 924, a database 925, one or more peripheral devices 926, and an interface 927. Alternatively and/or additionally, controller 901 may include one or more software components such as, for example, a computer-readable medium including computer executable instructions for performing a method associated with the exemplary embodiments. It is contemplated that one or more of the hardware components listed above may be implemented using software. For example, storage 924 may include a software partition associated with one or more other hardware components. It is understood that the components listed above are exemplary only and not intended to be limiting.

Processor 921 may include one or more processors, each configured to execute instructions and process data to perform one or more functions associated with a computer for facilitating single-person testing of a control system. Processor 921 may be communicatively coupled to RAM 922, ROM 923, storage 924, database 925, peripheral devices 926, and interface 927. Processor 921 may be configured to execute sequences of computer program instructions to perform various processes. The computer program instructions may be loaded into RAM 922 for execution by processor 921.

RAM 922 and ROM 923 may each include one or more devices for storing information associated with operation of processor 921. For example, ROM 923 may include a memory device configured to access and store information associated with controller 901, including information for identifying, initializing, and monitoring the operation of one or more components and subsystems. RAM 922 may include a memory device for storing data associated with one or more operations of processor 921. For example, ROM 923 may load instructions into RAM 922 for execution by processor 921.

Storage 924 may include any type of mass storage device configured to store information that processor 921 may need to perform processes consistent with the disclosed embodiments. For example, storage 924 may include one or more magnetic and/or optical disk devices, such as hard drives, CD-ROMs, DVD-ROMs, or any other type of mass media device.

Database 925 may include one or more software and/or hardware components that cooperate to store, organize, sort, filter, and/or arrange data used by controller 901 and/or processor 921. For example, database 925 may store data and/or instructions used to facilitate a method for a one-technician test of a control system. The method may comprising receiving, by the controller a field signal from the field device that is communicatively coupled to the controller. The controller is communicatively coupled with a cloud computing system. The controller returns a value in response to the field signal to a mobile computing device. The mobile computing device is also communicatively coupled to the cloud computing system. The mobile computing device executes an application that interfaces with the controller through a cloud service that executes on the cloud computing system that is communicatively coupled to the controller and the mobile computing device such that the value returned to the mobile computing device from the controller is routed through the cloud service. The application on the mobile computing device analyzes the controller value returned from the controller in response to the applied field signal to test the control system. Database 925 may also store data and/or instructions used to facilitate a method for testing a control system that requires only one technician, the method comprising the controller receiving a setting from a mobile computing device to set an output of the controller to a controller value. The mobile computing device is located at or near a remote field device that is communicatively coupled to the controller. The mobile computing device executes an application that interfaces with the controller through a cloud service. The cloud service executes on a cloud computing system that is communicatively coupled to the controller and the mobile computing device. The response of the field device to the set output of the controller is observed and recorded using the application on the mobile computing device. The application on the mobile computing device compares the observed response to an expected response to test the function of the control system. Results of the test are transmitted, using the mobile computing device, to cloud storage in the cloud computing system. It is contemplated that database 925 may store additional and/or different information than that listed above.

Peripheral devices 926 may include one or more components configured to communicate information with a user associated with controller 901. For example, peripheral devices 926 may include a console with an integrated keyboard and mouse to allow a user to enter information for configuring the controller 901, field devices, and the like using a configuration tool. Peripheral devices 926 may also include a display including a graphical user interface (GUI) for outputting information on a monitor. Peripheral devices 926 may also include devices such as, for example, a printer for printing information associated with controller 901, a user-accessible disk drive (e.g., a USB port, a floppy, CD-ROM, or DVD-ROM drive, etc.) to allow a user to input data stored on a portable media device, a microphone, a speaker system, an image capture device (e.g. camera), or any other suitable type of interface device.

Interface 927 may include one or more components configured to transmit and receive data via a communication network, such as the Internet, Ethernet, a local area network, a wide-area network, a workstation peer-to-peer network, a direct link network, a wireless network, or any other suitable communication platform. For example, interface 927 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method for a one-technician function test of an input from a field device, the method comprising:

receiving, by a controller over an I/O network, a field signal that is associated with a field device for the one-technician function test, wherein the field device is in its conventional operating state communicatively coupled to the controller through the I/O network and wherein the field device and the controller are sufficiently distanced apart from one another that conventional testing would require two technicians;

sending a controller value for the field device from the controller to a mobile computing device in response to the field signal, the mobile computing device located within a distance suitable for physical interaction with and/or visual inspection of the field device, wherein the mobile computing device executes an application that interfaces with the controller through a wireless network; and displaying, on a graphical user interface rendered by the application running on the mobile computing device, the controller value for the field device returned from the controller in response to the field signal.

2. The method according to claim 1, further comprising:
receiving, by the mobile computing device running the application, a function test results indication for the controller value for the field device returned from the controller in response to the field signal.

3. The method according to claim 2, further comprising:
transmitting, using the mobile computing device running the application, the function test results indication for the controller value for the field device returned from the controller in response to the field signal and the controller value for the field device returned from the controller in response to the field signal to a cloud computing system for storage in a cloud storage.

4. The method according to claim 3, wherein the function test results indication indicates validation or non-validation of the controller value for the field device returned from the controller in response to the field signal.

5. The method according to claim 3, wherein validation of the controller value for the field device returned from the controller in response to the field signal indicates a value, a scale and an engineering unit for the controller value for the field device returned from the controller in response to the field signal is acceptable.

6. The method according to claim 5, wherein non-validation of the controller value for the field device returned from the controller in response to the field signal indicates that at least one of the value, scale or engineering units of the controller value for the field device returned from the controller in response to the field signal are unacceptable.

7. The method according to claim 1, wherein the field signal is generated by the field device.

8. The method according to claim 1, wherein the field signal is generated by a calibration device.

9. The method according to claim 1, wherein the wireless network comprises a cloud service, and wherein the cloud service executes on a cloud computing system that is communicatively coupled to the controller and the mobile computing device.

10. The method according to claim 1, wherein the wireless network comprises a local wireless-fidelity (WiFi) network and the WiFi network is communicatively coupled to the controller and the mobile computing device.

11. A method for one-technician function testing of an output from a controller of a control system to a field device, the method comprising:

setting an output of a controller to a controller value using a mobile computing device, the mobile computing device located within a distance suitable for physical interaction with and/or visual inspection of a field device that is communicatively coupled to the controller through an input/output (I/O) network for the one-technician function testing, wherein the mobile computing device executes an application that interfaces with the controller through a wireless network, the field device is in its conventional operating state communicatively coupled to the controller through the I/O network, and the field device and the controller are sufficiently distanced apart from one another that conventional testing would require two technicians;

receiving, by the field device, the set output from the controller, wherein the set output is received by the field device through the I/O network; and receiving, by the mobile computing device, an indication of an observed response of the field device to the set output of the controller.

12. The method of claim 11 further comprising:

comparing the observed response to an expected response to test a function of the control system; and transmitting, using the mobile computing device, results of the comparing of the observed response to the expected response to test the function of the control system to a cloud storage in a cloud computing system.

13. The method according to claim 11, wherein receiving, by the mobile computing device, an indication of an observed response of the field device to the set output of the controller further comprises:

visually observing the response of the field device; and entering a value corresponding to the observed response of the field device into a graphical user interface rendered by the application running on the mobile computing device.

14. The method according to claim 11, wherein receiving, by the mobile computing device, an indication of an observed response of the field device to the set output of the controller further comprises:

measuring, using a sensing device, the response of the field device; and entering the measurement into a graphical user interface rendered by the application running on the mobile computing device.

15. The method according to claim 11, wherein the wireless network comprises a cloud service, and wherein the cloud service executes on a cloud computing system that is communicatively coupled to the controller and the mobile computing device.

16. The method according to claim 11, wherein the wireless network comprises a local wireless-fidelity (WiFi) network and the WiFi network is communicatively coupled to the controller and the mobile computing device and associated services.

17. A system to test a control system requiring one technician, the system comprising:

a control system including a controller and a field device, wherein the field device is in its conventional operating state communicatively coupled to the controller and is sufficiently distanced from the controller that conventional testing would require two technicians;

a mobile computing device running an application, wherein the application provides an interface that allows a technician to control or monitor the controller while observing the field device or while applying a field signal to the field device for a one-technician function test, wherein the mobile computing device is located within a distance suitable for physical interaction with and/or visual inspection of the field device; and a cloud computing system that is communicatively coupled to the controller and the mobile computing device, wherein the cloud computing system provides the application with cloud services to communicatively couple the mobile computing device and the controller and to store test results in a cloud storage.

18. The system according to claim 17, further comprising:

one or more computers communicatively coupled to the cloud computing system and running a dashboard application that utilizes cloud services to access test results.

19. The system according to claim 17, wherein the mobile computing device comprises a mobile phone or a tablet.

* * * * *